United States Patent
Toriu et al.

(10) Patent No.: US 6,184,892 B1
(45) Date of Patent: Feb. 6, 2001

(54) IMAGE PRODUCTION PROCESSING APPARATUS AND STRUCTURAL DATA GENERATING APPARATUS FOR GENERATING STRUCTURAL DATA USED IN THE IMAGE PRODUCTION PROCESSING APPARATUS

(75) Inventors: Takashi Toriu; Toshio Endoh; Makoto Goto, all of Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 08/966,000

(22) Filed: Nov. 7, 1997

(30) Foreign Application Priority Data

Nov. 14, 1996 (JP) .................................................. 8-303366

(51) Int. Cl.[7] .................................................. G06T 15/10
(52) U.S. Cl. .......................................................... 345/427
(58) Field of Search ................................... 345/427, 473; 382/308

(56) References Cited

U.S. PATENT DOCUMENTS

| | | | |
|---|---|---|---|
| 5,577,175 | * 11/1996 | Naka et al. ............................ | 195/127 |
| 5,590,261 | * 12/1996 | Sclaroff et al. ....................... | 395/173 |
| 5,703,961 | * 12/1997 | Rogina et al. ........................ | 382/154 |
| 5,710,875 | * 1/1998 | Harashima et al. .................. | 345/419 |
| 5,926,190 | * 7/1999 | Turkowski et al. .................. | 345/473 |

OTHER PUBLICATIONS

Beymer et al ("Image representations for Visual Learning"): Gale Group Magazine, Science,v272,n5270,p1905, 1995.*
Bensrhair et al ("Sun shines on 3–D vision sensor"): Bell & Howell, Sensor Review v15n3, pp17–20; ISSN:0260–2288, 1996.*
"Model Matching for Correspondence and Recognition": Stan Sclaroff & Alex P. Pentland, IEEE Transactions on Pattern Analysis and Machine Intelligence, vol. 17, No. 6, Jun., 1995.*
"Computer Graphics": Donald Hearn & M. Pauline Baker, ISBN 0–13–161530–0; Section 10.1, 1993.*
"Task Specific Gesture Analysis in Real–Time Using Interpolated views"—Darrell, Essa, & Pentland—IEEE Transactions on Pattern Analysis and Machine Intelligence, vol. 18, No. 12, Dec., 1995.*

* cited by examiner

Primary Examiner—Mark Zimmerman
Assistant Examiner—Mano Padmanabhan
(74) Attorney, Agent, or Firm—Staas & Halsey LLP

(57) ABSTRACT

An image production processing apparatus includes an input visual point image storage portion for storing body images obtained by taking pictures of a body from a plurality of visual points so that each of the body images corresponds to one of the plurality of visual points, an input feature point storage portion for storing positions of feature points, corresponding to each other, on the body images stored in the input visual point image storage portion, an input visual point storage portion for storing positions of the visual points from which the pictures of the body are taken to obtain the body images stored in the input visual point image storage portion, a visual point selecting portion for selecting a predetermined number of visual points from among the visual points stored in the input visual point storage portion when a visual point is specified, and an image producing portion for producing an body image from the specified visual point from the body images from the selected visual points, based on relationships between feature points on the body images from the selected visual points which feature points are obtained from the input feature point storage portion and relationships between the selected visual points and the specified visual point.

18 Claims, 36 Drawing Sheets

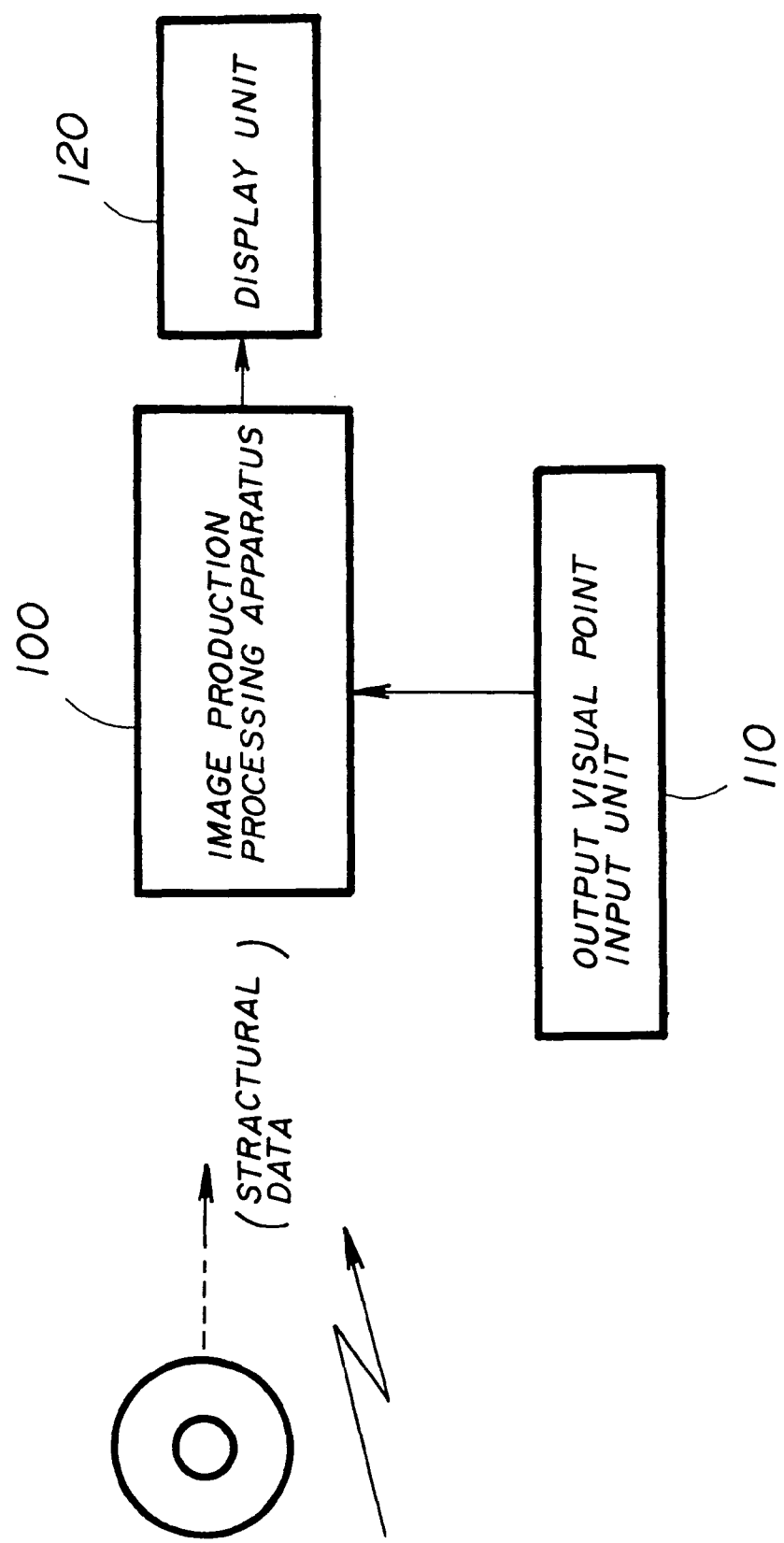

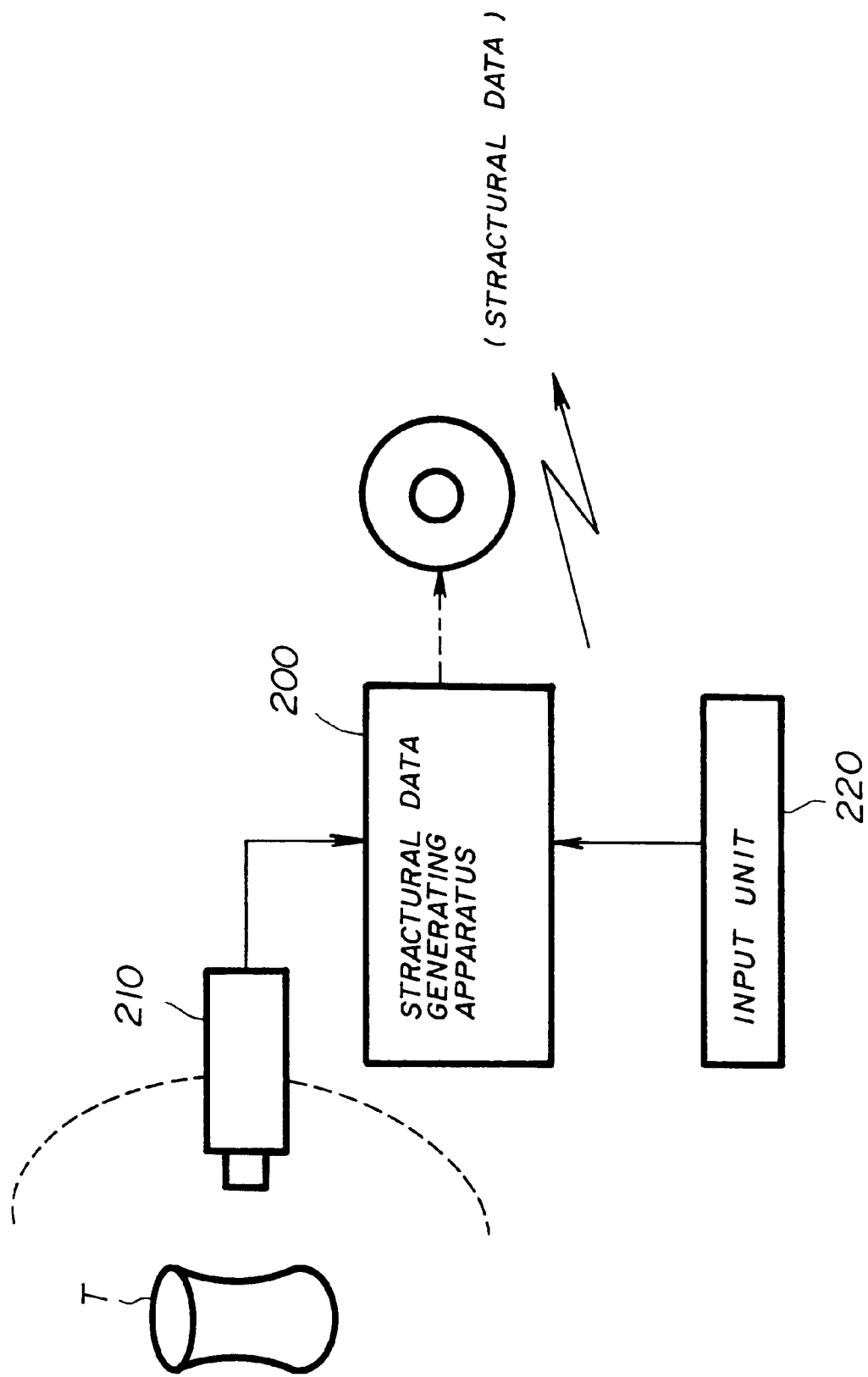

FIG.4A
VISUAL POINT A
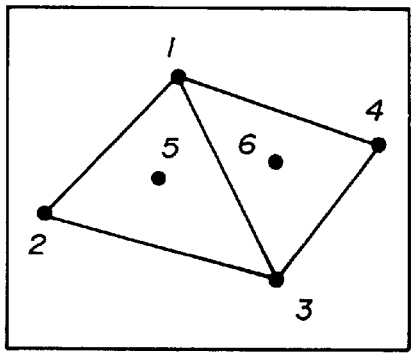
FIG.4B
VISUAL POINT B
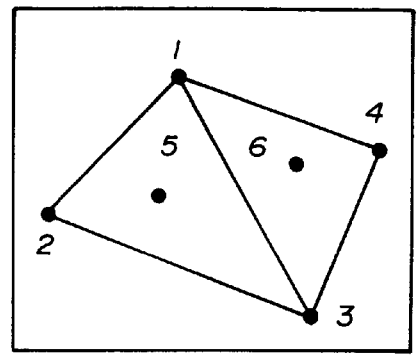
VISUAL POINT C
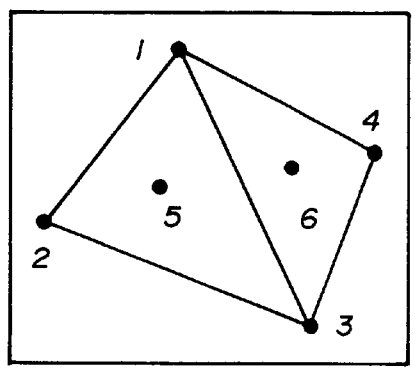
FIG.4C

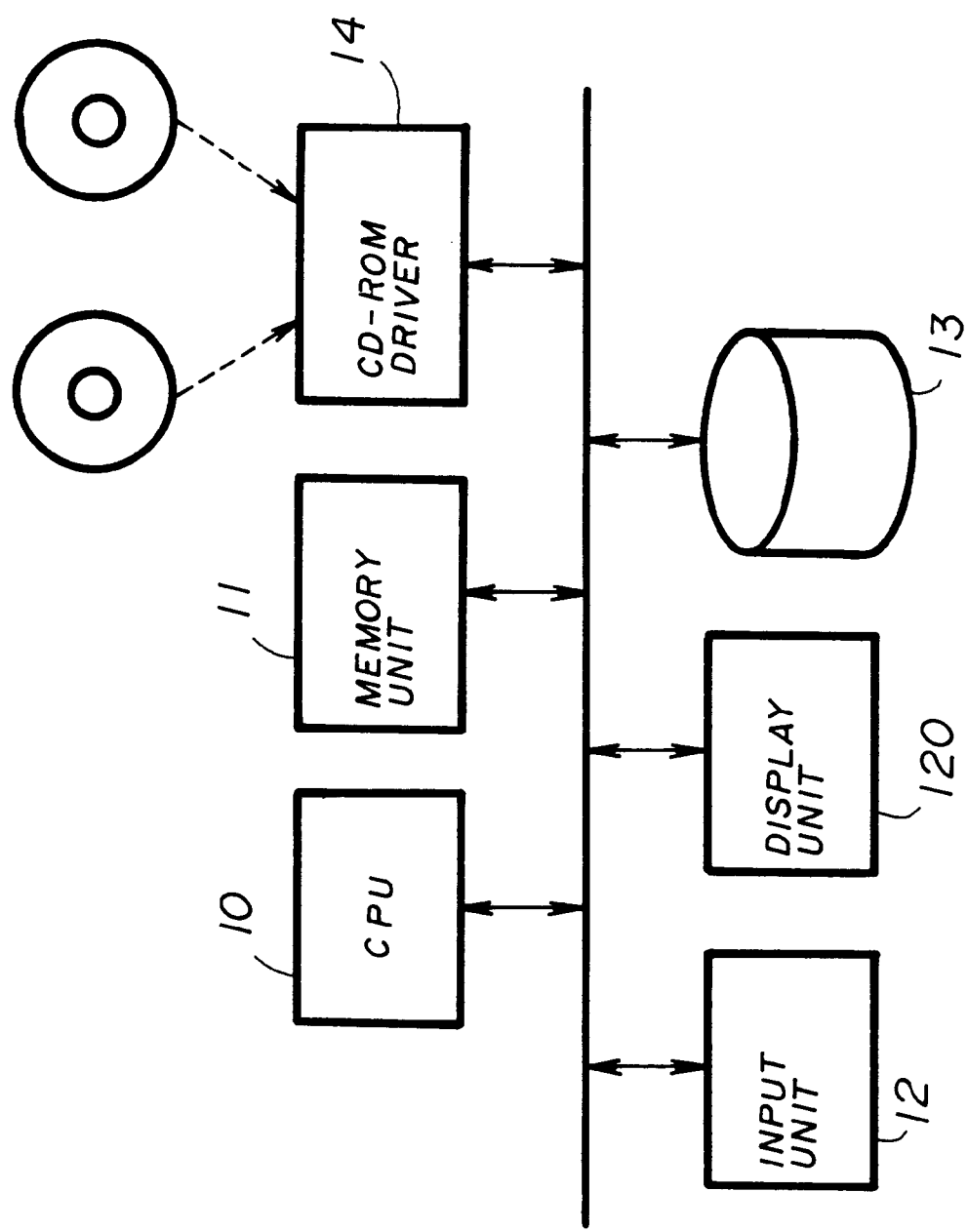

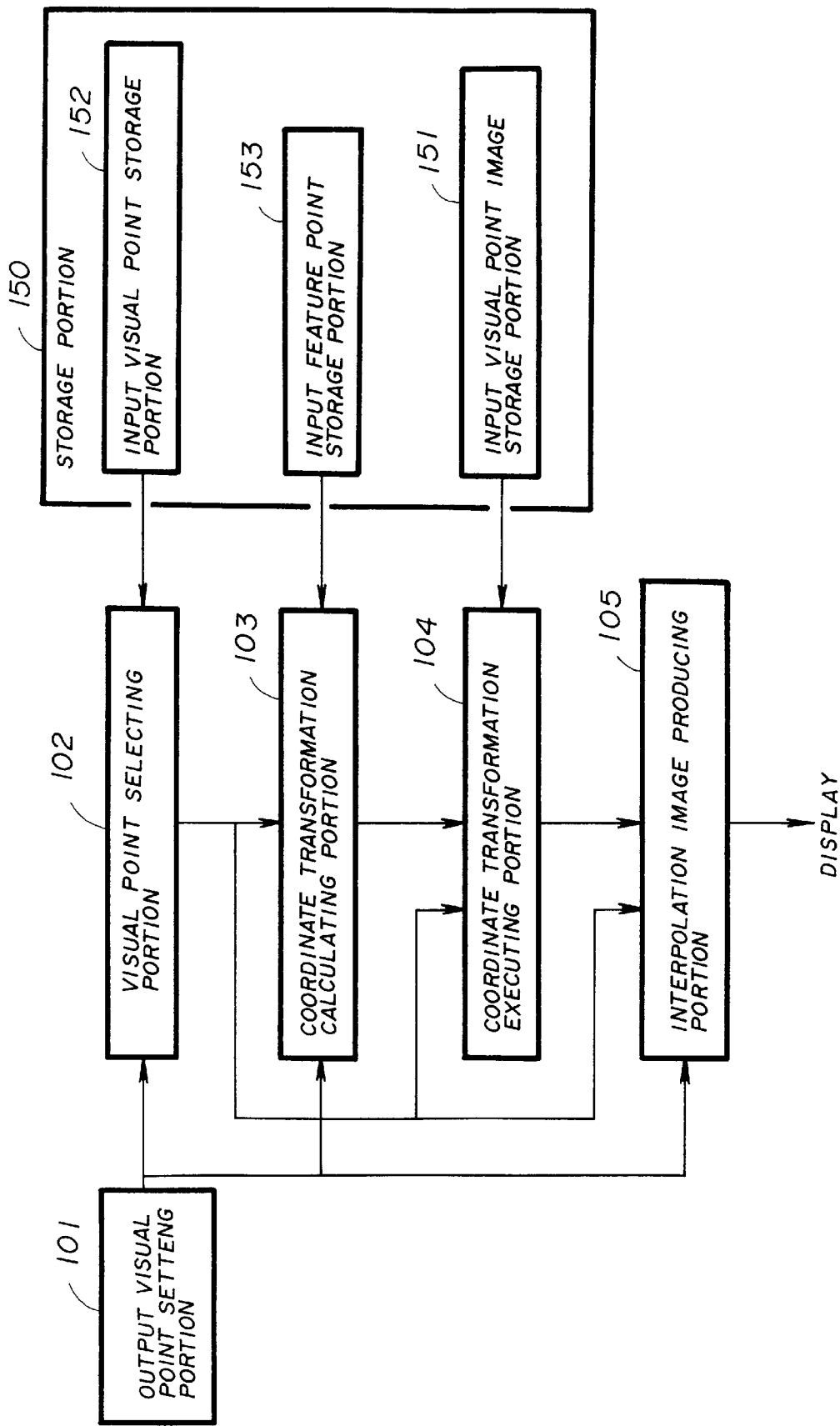

FIG.8

| VISUAL POINT 1 | | VISUAL POINT 2 | | ... | VISUAL POINT N | |
|---|---|---|---|---|---|---|
| LONGITUDE | LONGITUDE | LONGITUDE | LONGITUDE | | LONGITUDE | LONGITUDE |
| θ1 | φ1 | θ2 | φ2 | | θN | φN |

FIG.9

|  | FEATURE POINT 1 | | FEATURE POINT 2 | | ... | FEATURE POINT M | |
|---|---|---|---|---|---|---|---|
|  | x | y | x | y |  | x | y |
| VISUAL POINT 1 | x11 | y11 | x12 | y12 |  | x1M | y1M |
| VISUAL POINT 2 | x21 | y21 | 9999 | 9999 |  | x2M | y2M |
| --- |  |  |  |  |  |  |  |
| VISUAL POINT N | xN1 | yN1 | xN2 | yN2 |  | xNM | yNM |

FIG.19

| | | | |
|---|---|---|---|
| FEATURE POINT M | X | XM | |
| | Y | YM | |
| | Z | ZM | |
| ⋮ | | | |
| FEATURE POINT 2 | X | X2 | |
| | Y | Y2 | |
| | Z | Z2 | |
| FEATURE POINT 1 | X | X1 | |
| | Y | Y1 | |
| | Z | Z1 | |

FIG.23

| | TRIANGLE 1 | TRIANGLE 2 | TRIANGLE 3 | ... | TRIANGLE L |
|---|---|---|---|---|---|
| VISUAL POINT 1 | 1,2,6 | 2,5,6 | 2,4,5 | ... | 7,8,9 |
| VISUAL POINT 2 | — | 2,5,6 | 2,4,5 | ... | — |
| ... | — | — | — | ---- | — |
| VISUAL POINT N | 1,2,6 | — | — | ... | 7,8,9 |

FIG. 24

|  | QUADRANGLE 1 | QUADRANGLE 2 | QUADRANGLE 3 | ... | QUADRANGLE L |
|---|---|---|---|---|---|
| VISUAL POINT 1 | 1,2,5,6 | 2,3,4,5 | 3,7,8,4 | | 7,8,9,10 |
| VISUAL POINT 2 | — | 2,3,4,5 | 3,7,8,4 | | — |
| ... | | | | | |
| VISUAL POINT N | 1,2,5,6 | — | — | | 7,8,9,10 |

FIG.27

| TRIANGLE 1 | TRIANGLE 2 | TRIANGLE 3 | ... | TRIANGLE L |
|---|---|---|---|---|
| 1,2,6 | 2,5,6 | 2,4,5 | ... | 7,8,9 |

FIG.28

| QUADRANGLE 1 | QUADRANGLE 2 | QUADRANGLE 3 | . . . . | QUADRANGLE L |
|---|---|---|---|---|
| 1,2,5,6 | 2,3,4,5 | 3,7,8,4 | | 7,8,9,10 |

IMAGE PRODUCTION PROCESSING APPARATUS AND STRUCTURAL DATA GENERATING APPARATUS FOR GENERATING STRUCTURAL DATA USED IN THE IMAGE PRODUCTION PROCESSING APPARATUS

BACKGROUND OF THE INVENTION (1) Field of the Invention

The present invention relates to an image production processing apparatus for producing images of a body from various visual points and a structural data generating apparatus for generating structural data used in processes in the image production processing apparatus.

According to such an apparatus, three dimensional images (3D-images) of works of art, such as sculptures and potteries exhibited in a museum, are displayed on a display unit so that the works of art can be appreciated in various directions without going to the museum. In addition, such an apparatus can be applied to a system by which, in electronic shopping, the exterior of an article of commerce can be seen in various directions on a display screen.

A conventional system as shown in FIG. 1 has been proposed as a system by which images of a body from various visual points are displayed. Such a system is formed of a structural data generating apparatus 50 and an image production processing apparatus 60. The structural data generating apparatus 50 has a range sensor 51, a three-dimensional data generating unit 52, a TV-camera 53, a texture data generating unit 54 and a storage unit 55. The range sensor 51 measures a three-dimensional shape of a body T. The three-dimensional data generating unit 52 generates three-dimensional-shape data based on the measurement result of the range sensor 51. The TV-camera 53 takes a picture of the exterior of the body T. The texture data generating unit 54 generates, based on the picture data from the TV-camera 53, texture data representing colors of various parts of the body T. The storage unit 55 stores, as structural data, the three-dimensional-shape data and the texture data which are respectively generated by the three-dimensional data generating unit 52 and the texture data generating unit 55.

The structural data stored in the storage unit 55 is supplied to the image production processing apparatus 60, via a communication line or using a recording medium such as a CD-ROM.

The image production processing apparatus 60 has a storage unit 61, an output visual point setting unit 62 and a projection processing unit 63. The storage unit 61 stores the structural data supplied to the image production processing apparatus 60. The output visual point setting unit 62 sets a visual point of an output image (an output visual point). The projection processing unit 63 produces an image from the output visual point using a projection process. The image produced by the projection processing unit 63 is displayed on a display unit.

According to such a system, an image of the body T from a visual point can be produced from the three-dimensional-shape data of the body T and the texture data thereof using the so-called computer graphics technology (the projection process).

However, in the system described above, the three-dimensional shape measured from a body, such as a distorted pottery, having a complex shape is not necessarily correct. In addition, the texture obtained by taking a picture of the body by the TV-camera does not correctly correspond to positions on the surface of the measured body represented by the three-dimensional-shape data. Furthermore, in a case where a body is actually seen from various visual points, the color of the surface of the body is varied in accordance with position-relationships between a light source and the body with respect to various visual points. However, the variation of the color based on the position-relationships between the light source and the body with respect to various visual points can not be correctly represented by the projection process using a computer system.

Thus, an image of the body T from a visual point, which image is produced as described above, does not correctly correspond to the body actually seen from the visual point. The reality of an image of the body displayed on the display unit of the above system is not necessarily superior.

To eliminate the above disadvantage, the following system can be proposed.

In the system, pictures of a body from various visual points are previously taken and stored. A picture taken from a visual point which is closest to a visual point set by a user (an output visual point) is selected from among the stored pictures and displayed on a display unit. According to such a system, an image corresponding to a picture which was actually taken is displayed. Thus, the user can see an image having superior reality on the display unit.

However, to obtain an image from a visual point which is requested by a user or close to a visual point requested by the user, pictures of a body from many visual points must be taken and stored. Thus, to store the pictures (image data) of the body, a storage device having a large capacity must be used. In a case where pictures (image data) are supplied to the image production processing apparatus via a communication line, the communication line must have a wide band width to transmit a large amount of image data.

SUMMARY OF THE INVENTION

Accordingly, a general object of the present invention is to provide a novel and useful image production processing apparatus and structural data generating apparatus in which the disadvantages of the aforementioned prior art are eliminated.

A specific object of the present invention is to provide an image production processing apparatus by which an image of a body from a visual point having a superior reality can be produced although an amount of image data to be stored is relatively small.

The above objects of the present invention are achieved by an image production processing apparatus comprising: input visual point image storage means for storing body images obtained by taking pictures of a body from a plurality of visual points so that each of the body images corresponds to one of the plurality of visual points; input feature point storage means for storing positions of feature points, corresponding to each other, on the body images stored in the input visual point image storage means; input visual point storage means for storing positions of the visual points from which the pictures of the body are taken to obtain the body images stored in the input visual point image storage means; visual point selecting means for selecting a predetermined number of visual points from among the visual points stored in the input visual point storage means when a visual point is specified; and image producing means for producing a body image from the specified visual point from the body images from the selected visual points, based on relationships between feature points on the body images from the selected visual points which feature points are obtained from the input feature point storage means and relationships between the selected visual points and the specified visual point.

In the image production processing apparatus as described above, when a visual point is specified, a body image from the specified visual point is produced from body images from selected visual points, based on the relationships between the selected visual points and the specified visual point and the relationships between feature points set on the body images from the respective visual points. In addition, when the specified visual point is equal to one of the visual points stored in the input visual point storage means, the image producing means outputs a body image from the specified visual point stored in the input visual point image storage means.

According to the present invention, since the body images from the specified visual points are produced using the body images from visual points selected from the visual points stored in the visual point storage means, an image of a body from the specified visual point having a superior reality can be produced although an amount of image data to be stored is relatively small.

Another object of the present invention is to provide a structural data generating apparatus for generating the structural data used in the above image production processing apparatus.

The object of the present invention is achieved by a structural data generating apparatus comprising: input visual point image storage means for storing body images obtained by taking pictures of a body from a plurality of visual points so that each of the body images corresponds to one of the plurality of visual points; input feature point deciding means for deciding positions of feature points, corresponding to each other, on the body images from the visual points stored in the input visual point image storage means; and input feature point storage means for storing positions of feature points decided as the feature points corresponding to each other on the body images from the visual points, wherein the body images from the plurality of visual points stored in the input visual point image storage means and the feature points on the body images from the respective visual points stored in the input feature point storage means are supplied, as structural data, to an external system.

According to the present invention, at least a part of the structural data used in the above image production processing apparatus can be generated.

BRIEF DESCRIPTION OF THE DRAWINGS

Other objects, features and advantages of the present invention will be apparent from the following description when read in conjunction with the accompanying drawings, in which:

FIG. 2 is a block diagram illustrating a constitution of an image production processing apparatus according to a present invention;

FIG. 3 is a block diagram illustrating a constitution of a structural data generating apparatus according to a present invention;

FIGS. 4A, 4B and 4C are diagrams illustrating examples of images of a body from respective visual points and feature points on the respective images;

FIG. 5 is a block diagram illustrating an example of hardware of the image production processing apparatus;

FIG. 6 is a block diagram illustrating a first example of a functional constitution of the image production processing apparatus;

FIG. 8 is a diagram illustrating a table indicating positions of the visual points;

FIG. 9 is a diagram illustrating a table indicating positions of feature points set on images of the body from the respective visual points;

FIG. 19 is a diagram illustrating examples of three-dimensional coordinates of points of the body corresponding to the respective feature points;

FIG. 23 is a diagram illustrating a storing format of polygons on which feature points on images of the body from the respective visual points are placed at vertexes;

FIG. 24 is a diagram illustrating a storing format of polygons on which feature points on images of the body from the respective visual points are placed at vertexes;

FIG. 27 is a diagram illustrating a storing format of polygons on which feature points on images of the body from the respective visual points are placed at vertexes;

FIG. 28 is a diagram illustrating a storing format of polygons on which feature points on images of the body from the respective visual points are placed on vertexes;

DESCRIPTION OF THE PREFERRED EMBODIMENTS

Figure 1:
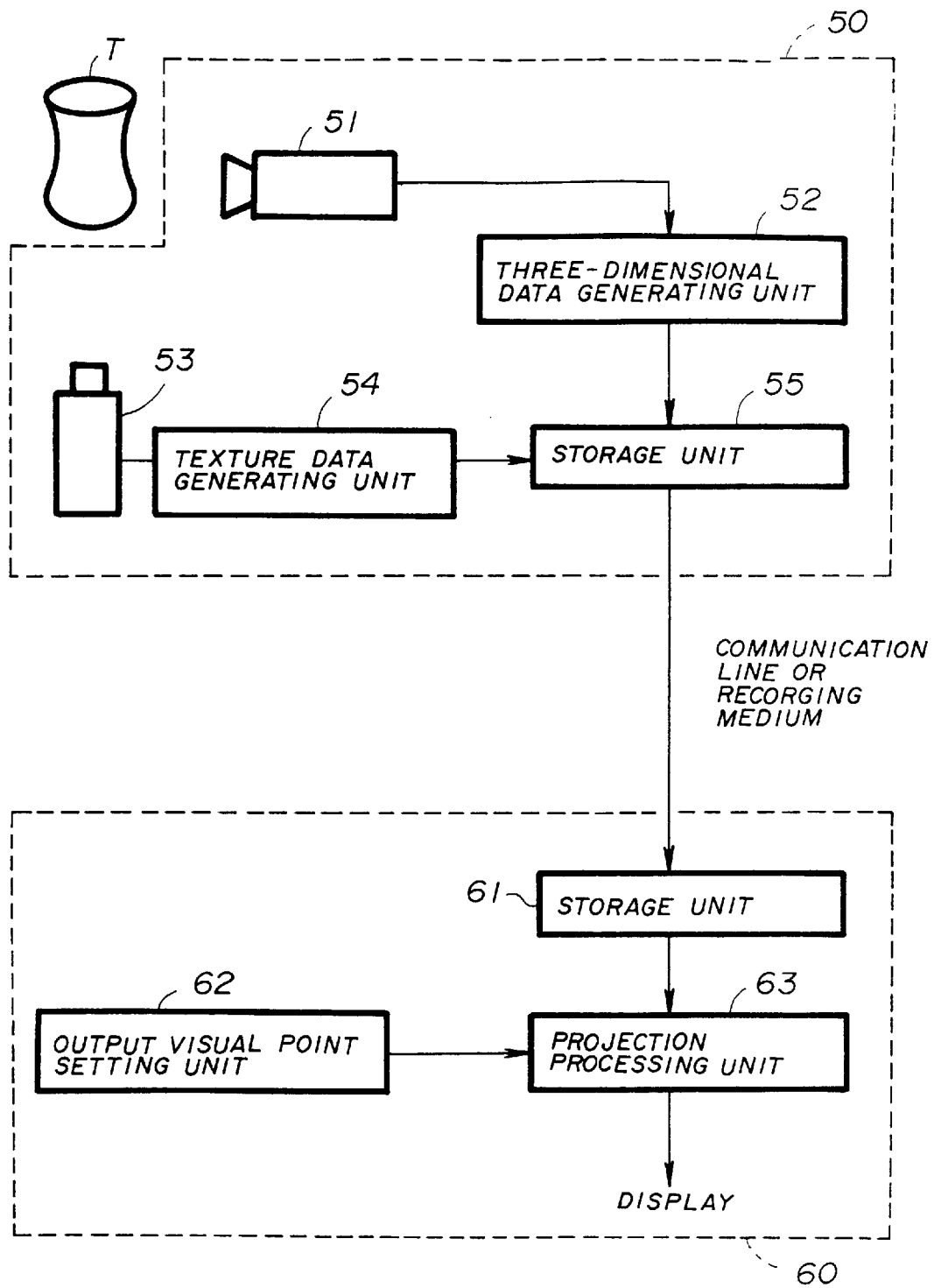
FIG. 1 is a block diagram illustrating a conventional image production processing apparatus.

A description will be given of embodiments of the present invention.

A system according to an embodiment of the present invention is formed as shown in FIGS. 2 and 3.

Referring to FIG. 2, an image production processing apparatus 100 produces, based on structural data supplied from an external unit, image data representing an image of a body from a visual point which is input by a user using an output visual point input unit 110. The image production processing apparatus 100 causes a display unit 120 to display an image of the body from the visual point based on the image data. The structural data used to produce image data representing an image of the body (a body image) from a visual point includes at least data representing images obtained by taking pictures of the body from a plurality of visual points, data representing feature points set on the images corresponding to the respective visual points and data representing the plurality of visual points.

The feature points set on the images corresponding to the respective visual points are managed so that feature points corresponding to the same point on the body correspond to each other. For example, as shown in FIGS. 4A, 4B and 4C, feature points, set on the images of a body (a triangular pyramid body) from visual points A, B and C, corresponding to the same point on the body are identified by the same reference numbers.

A part or all of the structural data to be used in the image production processing apparatus 100 is supplied to the image production processing apparatus 100 using a recording medium such as a CD-ROM or via a communication line. A part of the structural data or all the structural data is made by the structural data generating apparatus 200 as shown in FIG. 3.

As shown in FIG. 3, the structural data generating apparatus 200 stores images obtained by taking pictures of a body T from a plurality of visual points by a camera 210. Feature points are set on the images of the body T from the respective visual points. Points specified on the images by a user using an input apparatus (a mouse) 220 can be set as the feature points. The feature points corresponding to each other on the images of the body T can be automatically set based on the community of features of images of the body from the respective visual points.

As has been described above, the structural data generating apparatus 200 generates, at least as a part of the structural data, images obtained by taking pictures of the body T from a plurality of visual points and feature points set on the respective images of the body T. At least a part of such structural data is stored in the recording medium such as the CD-ROM, and the structural data may be supplied to the image production processing apparatus 100 using the recording medium. The structural data generated by the structural data generating apparatus 200 may be supplied to the image production processing apparatus 100 via a communication line.

The structural data generating apparatus 200 may store data representing the visual points when taking pictures of the body T from a plurality of visual points. In this case, the data representing the respective visual points is included in the structural data generated by the structural data generating apparatus 200. In addition, kinds of data, other than the data representing the images of the body from the plurality of visual points and the feature points, which should be included in the structural data generated by the structural data generating apparatus 200 are decided based on the kinds of structural data used in the image production processing apparatus 100.

The image production processing apparatus 100 may be formed using a normal computer system. In this case, the image production processing apparatus has a hardware constitution as shown in FIG. 5.

Referring to FIG. 5, the system has a CPU (Central Processing Unit) 10, a memory unit 11, an input unit 12, an external storage unit 13 and a CD-ROM driver 14 all of which are connected by a bus. In addition, a display unit 120 which displays an image of a body from a specified visual point is connected to the bus.

The CPU 10 executes various processes in accordance with programs stored in the memory unit 11. The memory unit 11 has a ROM (Read Only Memory) and a RAM (Random Access Memory), and stores programs corresponding to various processes and various kinds of data obtained in the processes. The memory unit 11 is also used as an image memory for storing image data (bit map data) representing an image to be displayed on the display unit 120. The input unit 12 has a key board and a mouse, and is used to input information to be used in the processes and to specify a visual point desired by the user. The external storage unit 13 is formed, for example, of a hard disk unit. A CD-ROM in which programs to be used to execute the processes in the image production processing apparatus 100 are stored in the CD-ROM driver 14. In accordance with the control of the CPU 10, the programs read out of the CD-ROM by the CD-ROM driver 14 are installed in the external storage unit 13. When the image production processing apparatus 100 is activated, the programs are read out of the external storage unit 13 and stored in the memory unit 11.

In addition, after the image production processing apparatus 100 is activated, another CD-ROM in which the structural data is stored may be set in the CD-ROM driver 14. In this case, based on the control of the CPU 10, the structural data is read out of the CD-ROM by the CD-ROM driver 14, and is installed in the external storage unit 13. After this, the CPU 10 executes the processes corresponding to respective functions of the image production processing apparatus 100 using structural data stored in the external storage unit 13, in accordance with the programs in the memory unit 11.

A functional constitution of the image production processing apparatus 100 which is formed using the computer system is shown in FIG. 6.

Referring to FIG. 6, the image production processing apparatus 100 has an output visual point setting portion 101, a visual point selecting portion 102, a coordinate transformation calculating portion 103, a coordinate transformation executing portion 104, an interpolation image producing portion 105 and a storage portion 150. The output visual point setting portion 101, the visual point selecting portion 102, the coordinate transformation calculating portion 103, the coordinate transformation executing portion 104 and the interpolation producing portion 105 correspond to processing steps executed by the CPU in accordance with the programs. The storage portion 150 is formed in the external storage unit 13.

The storage portion 150 has an input visual point image storage portion 151, an input visual point storage portion 152 and an input feature point storage portion 153. The respective kinds of structural data supplied using the CD-ROM are stored in the respective portions 151, 152 and 153 of the storage portion 150.

The input visual point image storage portion 151 stores data representing N images of a body which are taken from N visual points. The images corresponding to the respective visual points are assigned reference numbers 1 to N.

Figure 7:
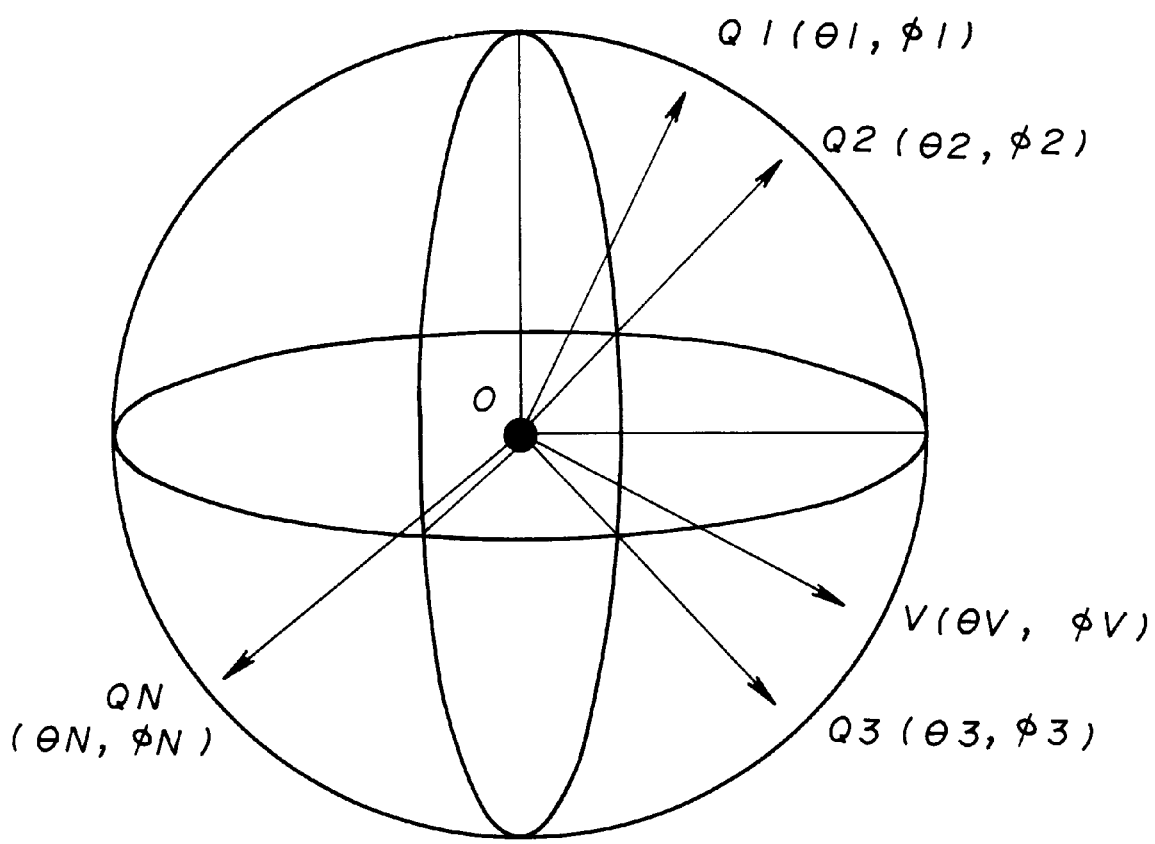
FIG. 7 is a diagram illustrating an example of data representing positions of visual points.

The input visual point storage portion 152 stores data representing N visual points from which the images of the body are taken. Each of the visual points are represented, as shown in FIG. 7, using vectors Q1, Q2, ..., QN extending from an origin at which the body is placed to the surface of a sphere having a radius of "1". Each of the vectors is identified by longitude θ and latitude φ on the sphere. That is, N visual points 1, 2, ..., N corresponding to N images are respectively identified by (θ1, φ1), (θ2, φ2), ..., (θN, φN). The data (longitude θ, latitude φ) identifying each of N visual points is stored in the input visual storage portion 152 as shown in FIG. 8.

The input feature point storage portion 153 stores coordinates of feature points set on N images of a body from different visual points stored in the input visual point storage portion 152. Feature points corresponding to each other, that is, feature points corresponding to the same point on the body, are managed using the same reference number. In the example as shown in FIGS. 4A, 4B and 4C, feature points 1 to 6 are set on images of the body from the visual points A, B and C. Coordinates of the feature points are stored in the input feature point storage portion 153 in a manner as shown in FIG. 9.

Referring to FIG. 9, coordinates of respective feature points 1, 2, ..., and M set on images of the body from a visual point 1 are represented by (x11, y11), (x12, y12), ..., and (x1M, y1M). A coordinate system used to represent the coordinates of the feature points is commonly set for the respective images, for example, on a display screen.

In addition, a feature point 2 is not seen from a visual point 2, so that the feature point 2 is not set on the body image from the visual point 2. Thus, in the example shown in FIG. 9, coordinates of the feature point 2 for the body image from the visual point 2 are represented by (9999, 9999).

The output visual point setting portion 101 sets, as a visual point of an output image, a visual point (θV, φV) which is specified by the user using the input unit 12 in an internal register of the CPU 10. For example, the user specifies a visual point as follows.

An X-Y coordinate system is set on the display screen so that an origin of the X-Y coordinate system is on the center of the display screen. In a state where an image of a body seen from a visual point (θ, φ) has been displayed on the screen of the display unit 120, when a point (x, y) is designated by the mouse (the input unit 12), a visual point (θ+x, φ+y) is set as a new visual point (θV, φV).

The visual point selecting portion 102 selects, from among the visual points stored in the input visual point storage portion 152, a predetermined number K of visual points which are close to the visual point (θV, φV) set by the output visual point setting portion 102. The predetermined number K is set, for example, at "3" (K=3). In this case, the visual point selecting portion 102 selects three visual points from among N visual points.

As shown in FIG. 7, a point defined by the specified visual point (θV, φV) on the surface of the sphere having the radius of "1" is represented by "V", and points defined on the surface of the sphere having the radius of "1" so as to correspond to the respective visual points (θ1, φ1), (θ2, φ2), ..., (θN, φN) are represented by Q1, Q2, ..., and QN. Distances between the point V and the respective points Q1, Q2, ..., and QN are calculated. Visual points corresponding to the three smallest distances are selected.

In addition, visual points may also be selected as follows.

The surface of the sphere having the radius of "1" is divided into triangles each of which are formed of three of the points Q1, Q2, ..., and QN corresponding to the visual points (θ1, φ1), (θ2, φ2), ..., and (θN, φN). The sphere is approximated by a polyhedron having triangular surfaces. Visual points corresponding to three vertexes of a triangular surface which a vector V representing a specified visual point intersects are selected.

The coordinate transformation calculating portion 103 calculates a coordinate transformation equation used to transform points on the respective body images from three (K) visual points selected by the visual point selecting portion 102 to points on a body image from a visual point set by the output visual point setting portion 101. The coordinate transformation calculating portion 103 operates as follows.

Each of the visual points selected by the visual point selecting portion 102 and each of the other selected visual points are paired so that visual point pairs for each of the selected points are formed. For example, in a case where visual points A, B and C are selected, visual point pairs (A, B) and (A, C) is formed for the visual point A, visual point pairs (B, A) and (B, C) are formed for the visual point B, and visual point pairs (C, A) and (C, B) are formed for the visual point C.

As shown in FIGS. 10A, 10B and 10C, 6 (M) feature points are set on each of body images IA, IB and IC from the visual points A, B and C. Although feature points set on a body image may not be set on another body image, such feature points are omitted and M feature points are set on each of the body images so that feature points on the respective body images correspond to each other. The coordinates of the feature points set on the respective body images from the visual points A, B and C are represented, for example, by (xa1, ya1)–(xaM, yaM), (xb1, yb1)–(xbM, ybM) and (xc1, yc1)–(xcM, xcM).

With respect to a visual point pair (A, B), a coordinate transformation equation used to transform the feature points (xa1, ya1)–(xaM, yaM) on the body image from the visual point A are transformed into the feature points (xb1, yb1)–(xbM, ybM) on the body image from where the visual point B is calculated. That is, continuous functions fab and gab having two variables:

$$x' = fab(x, y) \text{ and } y' = gab(x, y)$$

are calculated. These functions satisfy the following conditions.

$$xbi = fab(xai, yai) \text{ and } ybi = gab(xai, yai) \quad (1)$$

A description will now be given of a procedure in accordance with which the coordinate transformation equation used to transform the body image IA into the body image IB is calculated with respect to the visual point pair (A, B). With another visual point pair, a coordinate transformation equation used to transform one body image to another body image is calculated in the same procedure.

The fab and gab are polynomial expressions of x and y. Coefficients of the polynomial expressions are decided so that the above conditions (1) are satisfied as much as possible. That is, the coefficients of the polynomial expressions are decided so that a value of $$\sum_{i=1}^{M} \{(xbi - fab(xai, yai))^2 + (ybi - gab(xai, yai))^2\} \quad (2)$$

is minimum. The formula (2) is a quadratic formula with regard to each of coefficients. Thus, the formula (2) is differentiated by the respective coefficients and the differential results are set at zero, so that linear equations are obtained. A number of the linear equations is equal to a number of coefficients. These simultaneous linear equations are can be solved using a mathematical library.

The coordinate transformation equation (1) can be also obtained as follows.

Figure 10A:
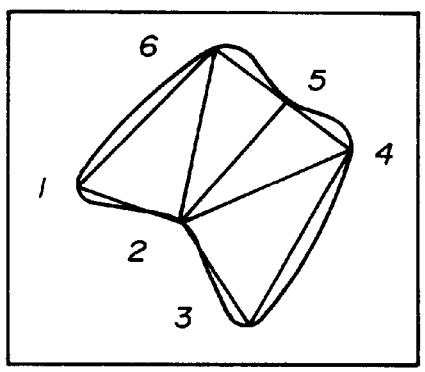
FIGS. 10A, 10B and 10C are diagrams illustrating examples of polygons on which feature points on images of the body from the respective visual points are placed at vertexes.
Figure 10B:
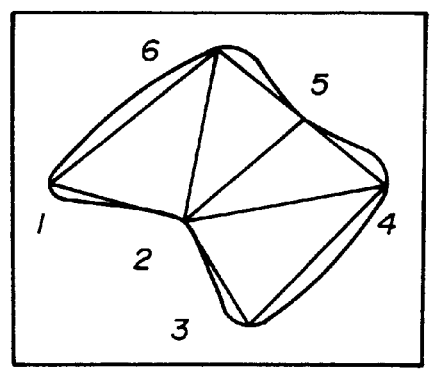
Figure 10C:
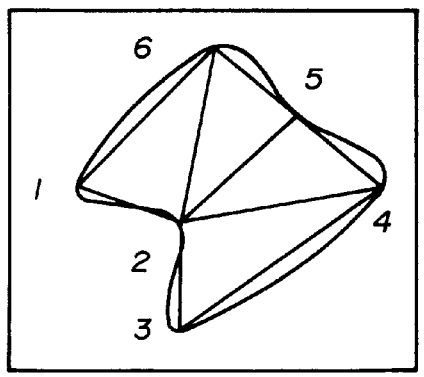

As shown in FIGS. 10A, 10B and 10C, each of the body images from the visual points selected by the visual point selecting portion 102 is divided by triangles each of which is formed of three of the feature points set on each of the body images. In the respective body images, triangles formed of feature points corresponding to each other are managed so as to correspond to each other. That is, in FIGS. 10A, 10B and 10C, for example, if a triangle Δ126 is included in the body image IA, triangles formed of the feature points 1, 2 and 6 are included in the other body images IB and IC.

As has been described above, although in general, there may be feature points which are set on a body image but not set on another body image, such feature points are omitted. Thus, the above relationship regarding triangles between the body images is held.

An affine transformation to transform respective points on the triangle Δ126 of the body image IA into points on a corresponding triangle Δ126 of the body image IB is calculated. The affine transformation to transform a triangle into another triangle and a method to obtain the affine transformation are known. In accordance with the known method, the affine transformation to transform the triangle Δ126 of the body image IA into a corresponding triangle Δ126 of the body image IB is obtained. The affine transformation to transform all triangles included in the body image IA into corresponding triangles included in the body image IB is obtained in the same manner.

The body image IA from the visual point A is covered with such triangles. A point (xbi, ybi) into which a point (xai, yai) included in a triangle on an area of the body image IA is transformed using the affine transformation is obtained as a corresponding point on an area of the body image IB. In this case, the following coordinate transformation equations based on the affine transformation are calculated.

$$xbi = fab(xai, yai), ybi = gab(xai, yai)$$

The coordinate transformation equation may also be obtained as follows.

Figure 11A:
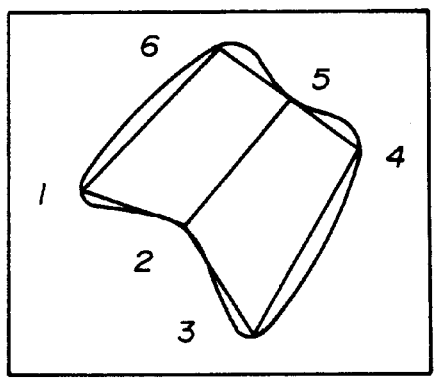
FIGS. 11A, 11B and 11C are diagrams illustrating other examples of polygons on which feature points on images of the body from the respective visual points are placed at vertexes.
Figure 11B:
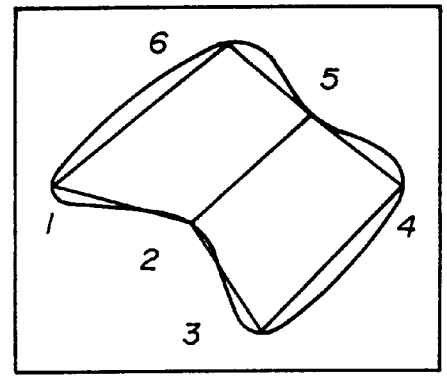
Figure 11C:
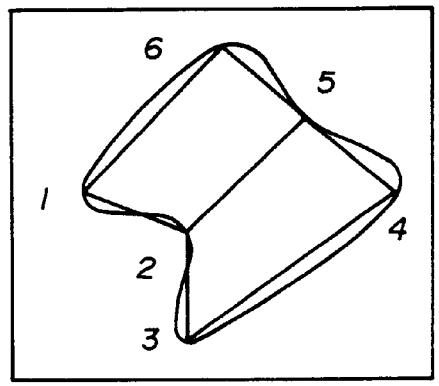

As shown in FIGS. 11A, 11B and 11C, each of the body images from the visual points selected by the visual point selecting portion 102 is divided into quadrangles formed of four of the feature points set on a corresponding one of the body images. In the same manner as in the case of the triangles described above, in the respective body images, quadrangles formed of feature points corresponding to each other are managed so as to correspond to each other. That is, in FIGS. 11A, 11B and 11C, if a quadrangle □1256 is included in the body image IA, quadrangles formed of corresponding feature points 1, 2, 5 and 6 are included in the other body images IB and IC.

A perspective transformation to transform respective points on the quadrangle □1256 of the body image IA into points on a corresponding quadrangle □1256 of the body image IB is calculated. The perspective transformation to transform a quadrangle into another quadrangle and a method to obtain the perspective transformation are known. In accordance with the known method, the perspective transformation to transform the quadrangle □1256 of the body image IA into a corresponding quadrangle □1256 of the body image IB is obtained. The perspective transformation to transform all quadrangles included in the body image IA into corresponding quadrangles included in the body image IB is obtained in the same manner.

The body image IA from the visual point A is covered with such quadrangles. A point (xbi, ybi) into which a point (xai, yai) included in a quadrangle on an area of the body image IA is transformed using the perspective transformation is obtained as a corresponding point on an area of the body image IB. In this case, the following coordinate transformation equations based on the perspective transformation are calculated.

$$xbi = fab(xai, yai), ybi = gab(xai, yai)$$

The coordinate transformation equations to transform points on the body image from the visual point A into points on the body image from the visual point B are obtained, in accordance with one of the three methods described above, as follows.

$$xb = fab(xa, ya), yb = gab(xa, ya)$$

With respect to each of the other visual points, the same process is performed as in the above case, so that the coordinate transformation equations to transform a body image from one visual point into a body image from another visual point is obtained.

Next, with respect to the visual point pairs (A, B) and (A, C), coordinate transformation equations used to transform the body image IA from the visual point A into a body image from a visual point V specified by the user is calculated based on the coordinate transformation equations obtained as described above. That is, the coordinate transformation equations are calculated as follows.

The coordinate transformation equations used to transform a point (xa, ya) on the body image IA into a point (xb, yb) on the body image IB are obtained as $xb=fab(xa, ya)$ and $yb=gab(xa, ya)$.

The coordinate transformation equations used to transform the point (xa, ya) on the body image IA into a point (xc, yc) on the body image IC are obtained as $xc=fac(xa, ya)$ and $yc=gac(xa, ya)$.

The coordinate transformation equations used to transform the point (xa, ya) on the body image IA into a point (xv, yv) on the body image IV from the visual point V can be calculated as $xv=fav(xa, ya)$ $=\alpha xa+\beta fab(xa, ya)+\tau fac(xa, ya)$ $yv=gav(xa, ya)$ $=\alpha ya+\beta gab(xa, ya)+\tau gac(xa, ya)$ (3)

In the equations (3), $\alpha$, $\beta$ and $\tau$ are weights depending on a position of the output visual point. The sum of the weights is equal to one ($\alpha+\beta+\tau=1$). The respective weights $\alpha$, $\beta$ and $\tau$ are calculated as follows.

Figure 12:
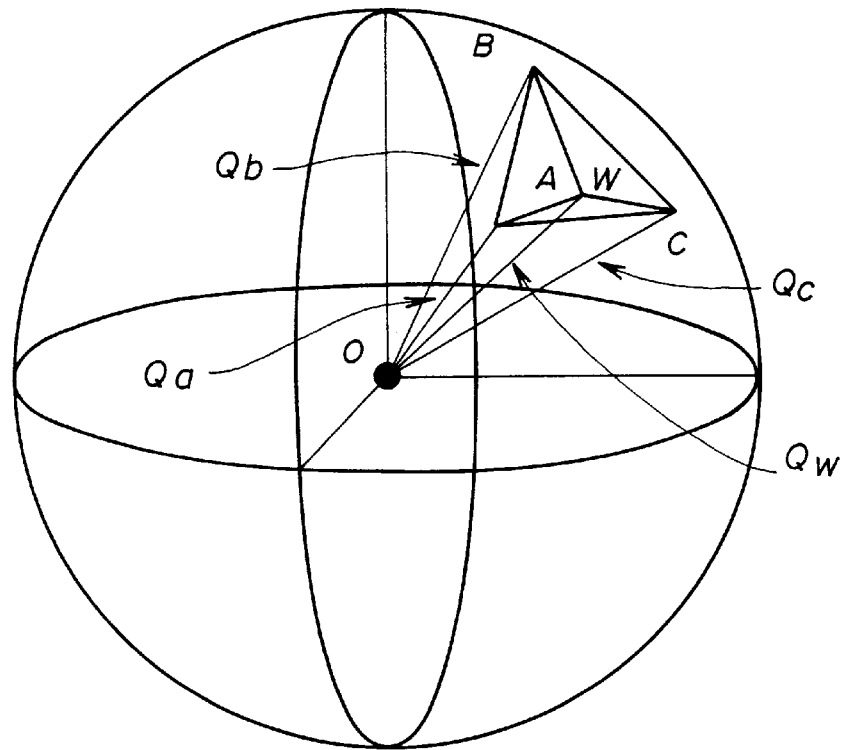
FIG. 12 is a first diagram illustrating a relationship between specified visual point and a selected visual point.

In FIG. 12, the respective visual points A, B and C are represented by position vectors Qa, Qb and Qc. A point W at which a line connecting the origin O and the visual point V specified by the user intersects a triangle ABC is represented by a position vector Qw. In this case, the weights $\beta$ and $\tau$ are decided so as to satisfy the following equation.

$Qw=Qa+\beta(Qb-Qa)+\tau(Qc-Qa)$

Figure 13:
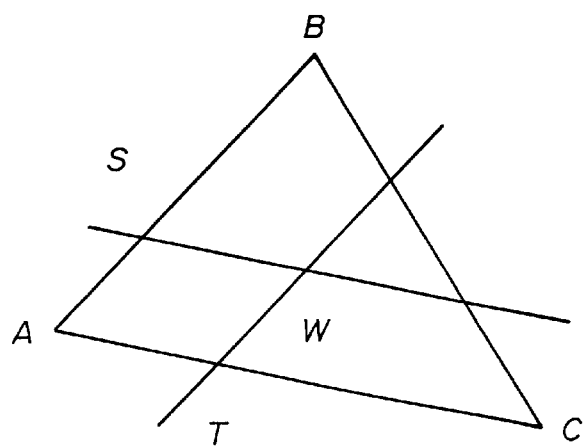
FIG. 13 is a second diagram illustrating a relationship between specified visual point and a selected visual point.
Figure 14:
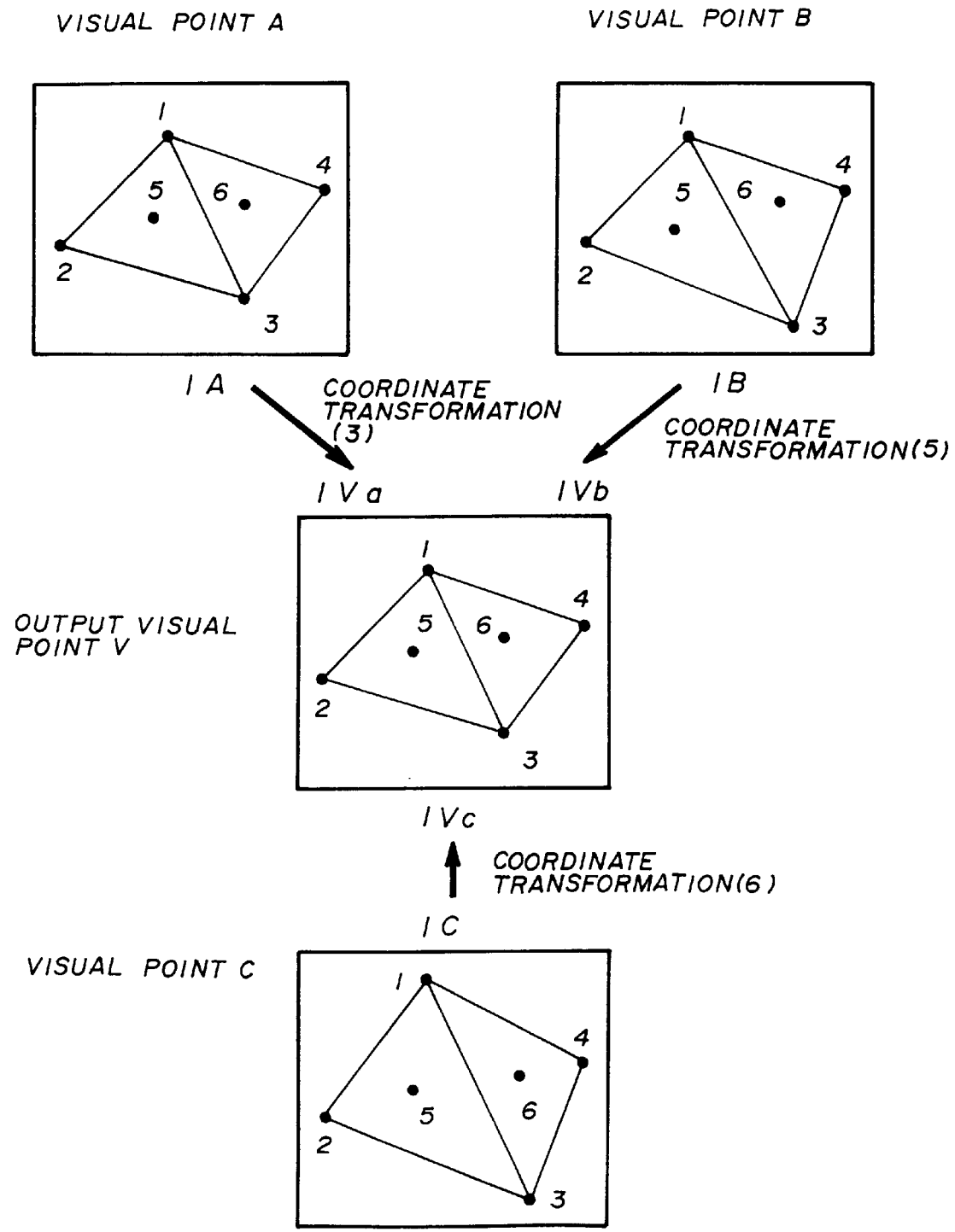
FIG. 14 is a diagram illustrating a conversion from images of the body from the specified visual points to an image of the body from the selected visual points.

As shown in FIG. 13, a point at which a line passing through the point W and parallel to a line AC intersects a line AB is represented by S. A point at which a line parallel to the line AB intersects the line AC is represented by T. In this case, the weights $\alpha$, $\beta$ and $\tau$ are calculated according to the following equations.

$\beta=AS/AB$, $\tau=AT/AC$, and $\alpha=1-\beta-\tau$ (4)

Thus, the coordinate transformation equations used to transform the body image IA from the visual point A into the body image from the visual point specified by the user is calculated as indicated by (3) (the weights $\alpha$, $\beta$ and $\tau$ are decided by the equations (4)).

In the same manner as in the above case, coordinate transformation equations used to transform the body image IB from the visual point B into the body image from the visual point V specified by the user are calculated as follows.

$xv=fbv(xb, yb)$ $=\beta xb+\tau fbc(xb, yb)+\alpha fba(xb, yb)$ $yv=gbv(xb, yb)$ $=\beta yb+\tau gbc(xb, yb)+\alpha gba(xb, yb)$ (5)

In addition, coordinate transformation equations used to transform the body image IC from the visual point C into the body image from the visual point specified by the user are calculated as follows.

$xv=fcv(xc, yc)$ $=\tau xc+\alpha fca(xc, yc)+\beta fcb(xc, yc)$ $yv=gcv(xc, yc)$ $=\tau yc+\alpha gca(xc, yc)+\beta gcb(xc, yc)$ (6)

The coordinate transformation executing portion 104 shown in FIG. 6 performs a process for transforming body images from the respective selected visual point to a body image from the visual point V specified by the user in accordance with the respective coordinate transformation equations calculated by the coordinate transformation calculating portion 103.

The coordinate transformation equation (3) used to transform the body image IA from the visual point A into the body image from the visual point V represents that a point (xa, ya) (a position of a pixel) on the body image IA corresponds to a point (xv, yv)=(fav(xa, ya), gav(xa, ya)) on the body image IV. Based on this relationship, a color of a pixel located at the position (xa, ya) on the body image IA is assigned to a pixel located at the position (xv, yv) on the body image IV, so that the body image IVa from the visual point V is produced.

Instead of the coordinate transformation equation:

$(xv, yv)=(fav(xa, ya), gav(xa, ya))$, a reverse coordinate transformation equation may be used. In this case, a coordinate transformation equation to transform the body image from the visual point V into the body image IA from the visual point A is calculated as follows.

$(xa, ya)=(fva(xv, yv), gva(xv, yv))$

In accordance with this coordinate transformation equation, a color of a pixel located at a position (xv, yv) on the body image IV is decided so as to be the same color as a corresponding pixel located at a position (xa, ya) on the body image IA.

In the same manner, in accordance with the coordinate transformation equation (5), a color of a pixel located at a position (xb, yb) on the body image IB from the visual point B is assigned to a pixel located at a corresponding position (xv, yv) on the body image IV from the visual point V, so that a body image IVb from the visual point V is produced. Further, in accordance with the coordinate transformation equation (6), a color of a pixel located at a position (xc, yc) on the body image IC from the visual pint C is assigned to a pixel located at a corresponding position (xv, yv) on the body image IV from the visual point V, so that a body image IVc from the visual point V is produced.

As has been described above, due to the process of the coordinate transformation executing portion 104, the body images IVa, IVb and IVc from the visual point V specified by the user are produced, in accordance with the coordinate transformation equations (3), (5) and (6), from the body images IA, IB and IC from the respective visual points A, B and C selected by the visual point selecting portion 102.

The interpolation image producing portion 105 produces an interpolation image IV based on the body images IVa, IVb and IVc from the visual point V which are produced as described above. The interpolation image IV is an image to be actually displayed on the display unit 120.

That is, using weights $\alpha$ (corresponding to a relationship between the visual points A and V), $\beta$ (corresponding to a relationship between the visual points B and V) and $\tau$ (corresponding to a relationship between the visual points C and V), the interpolation image IV is produced in accordance with the following equation.

$$IV = \alpha IVa + \beta IVb + \tau IVc \qquad (7)$$

The equation (7) means that a color of a pixel located at a position (xv, yv) on the interpolation image IV is synthesized from colors of pixels located at corresponding positions (xa, ya), (xb, yb) and (xc, yc) on the respective body images IA, IB and IC. That is, the color of a pixel located at a position (xv, yv) on the interpolation image IV is the sum of a color component obtained by multiplying together a color of a pixel located at a corresponding position (xa, ya) on the body image IA and the weight $\alpha$, a color component obtained by multiplying together a color of a pixel located at a corresponding position (xb, yb) on the body image IB and the weight $\beta$, and a color component obtained by multiplying together a color of a pixel located at a corresponding position (xc, yc) on the body image IC and the weight $\tau$.

The interpolation image IV produced as described above is supplied to the display unit 120 and displayed on the display unit 120, under the control of the CPU 10.

In the image production processing apparatus 100 as described above, when the user specifies a visual point V from which the body is seen, a plurality of visual points closest to the specified visual point V are selected from among predetermined visual points. A body image from the specified visual point V is produced in accordance with the coordinate transformation equations which are calculated based on relationships among the corresponding feature points on the respective body images from the selected visual points. The body image from the visual point V specified by the user is then displayed on the display unit 120. As a result, the user can see the body from a desired visual point on the screen of the display unit 120.

Figure 15:
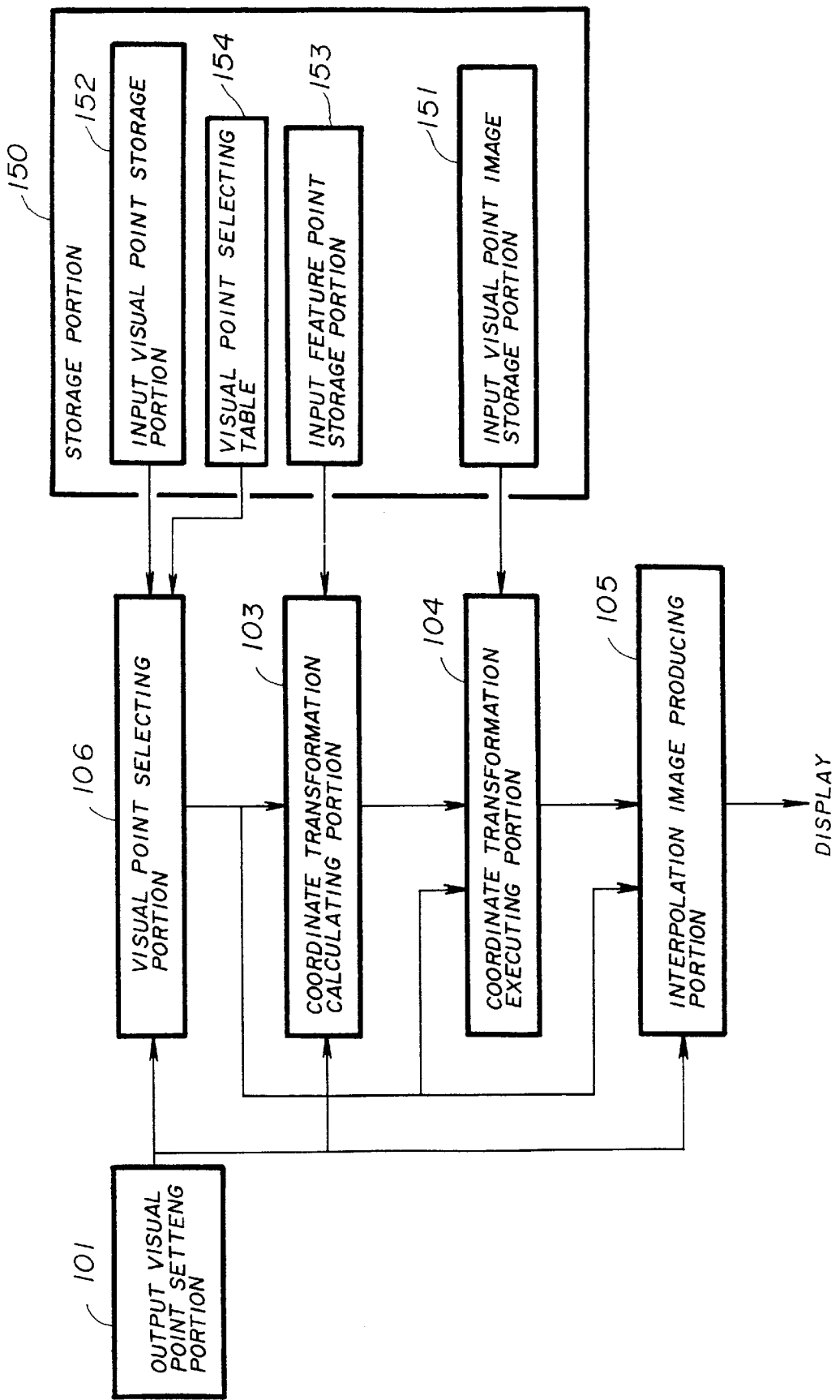
FIG. 15 is a block diagram illustrating a second example of the functional constitution of the image production processing apparatus.

In the above embodiment, the visual point selecting portion 102 calculates distances between N visual points stored in the input visual point storage portion 152 and the visual point V specified by the user, and selects, for example, three visual points close to the specified visual point V. That is, every time the user specifies a visual point, distances between N visual points stored in the input visual point storage portion 152 and the specified visual point must be calculated. Thus, processing time is long. To eliminate this disadvantage, the image production processing apparatus 100 may be formed as shown in FIG. 15. In FIG. 15, those parts which are the same as those shown in FIG. 5 are given the same reference numbers.

In this example, a visual point selecting table 154 is added to the structural data storage portion 150 formed in the external storage unit 13. A visual point selecting portion 106 then selects visual points with reference to the visual point selecting table 154.

Figure 16:
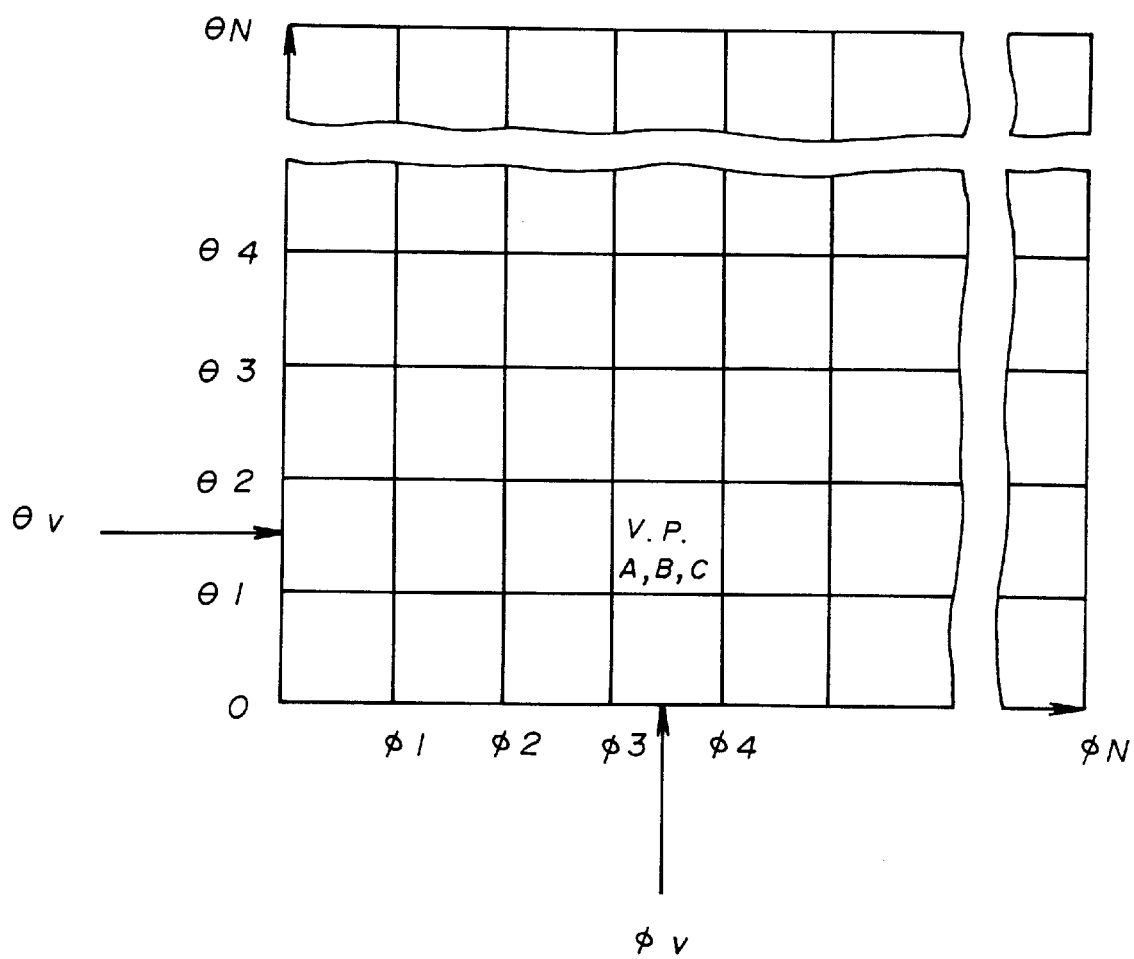
FIG. 16 is a diagram illustrating a table used to selecting a visual point.

The visual point selecting table 154 indicates which visual points should be selected from among the visual points stored in the input visual point storage portion 152 based on a visual point specified by the user. For example, the visual point selecting table 154 is formed as shown in FIG. 16. That is, a longitudinal $\theta$ line and a latitudinal $\phi$ line are respectively divided into sections so that a matrix including section areas is formed. Each of the section areas is identified by a range of the longitude $\theta$ (a longitudinal range) and a range of the latitude $\phi$ (a latitudinal range). Visual points to be selected are indicated in each of the section areas. When a visual point V identified by the longitude $\theta$ and the latitude $\phi$ is specified by the user, visual points indicated in a section area to which the longitude $\theta$ and latitude $\phi$ of the specified visual point belong are selected. For example, when a visual point ($\theta v$, $\phi v$) identified by the longitude $\theta v$ within a range between $\theta 1$ and $\theta 2$ and the latitude $\phi v$ within a range between $\phi 3$ and $\phi 4$ is specified by the user, visual points A, B, and C indicated in a section area identified by the latitudinal range between $\theta 1$ and $\theta 2$ and the latitude range between $\phi 3$ and $\phi 4$ are selected.

The visual point selecting table may be made in the structural data generating apparatus 200. In this case, the visual point selecting table is supplied to the image production processing apparatus 100 using the CD-ROM or via the communication line along with other items (body image data from the respective visual points, feature points and the like) of the structural data. In addition, the visual point selecting table may be made in another external unit or the image production processing apparatus 100, based on information of the respective visual points to stored in the input visual point storage portion 152.

As has been described above, due to use of the visual point selecting table 154 to select visual points of images to which the coordinate transformation should be applied, it is not necessary to calculate the distances between the specified visual point and the respective selected visual points. As a result, a processing time for selecting visual points can be reduced.

Figure 17:
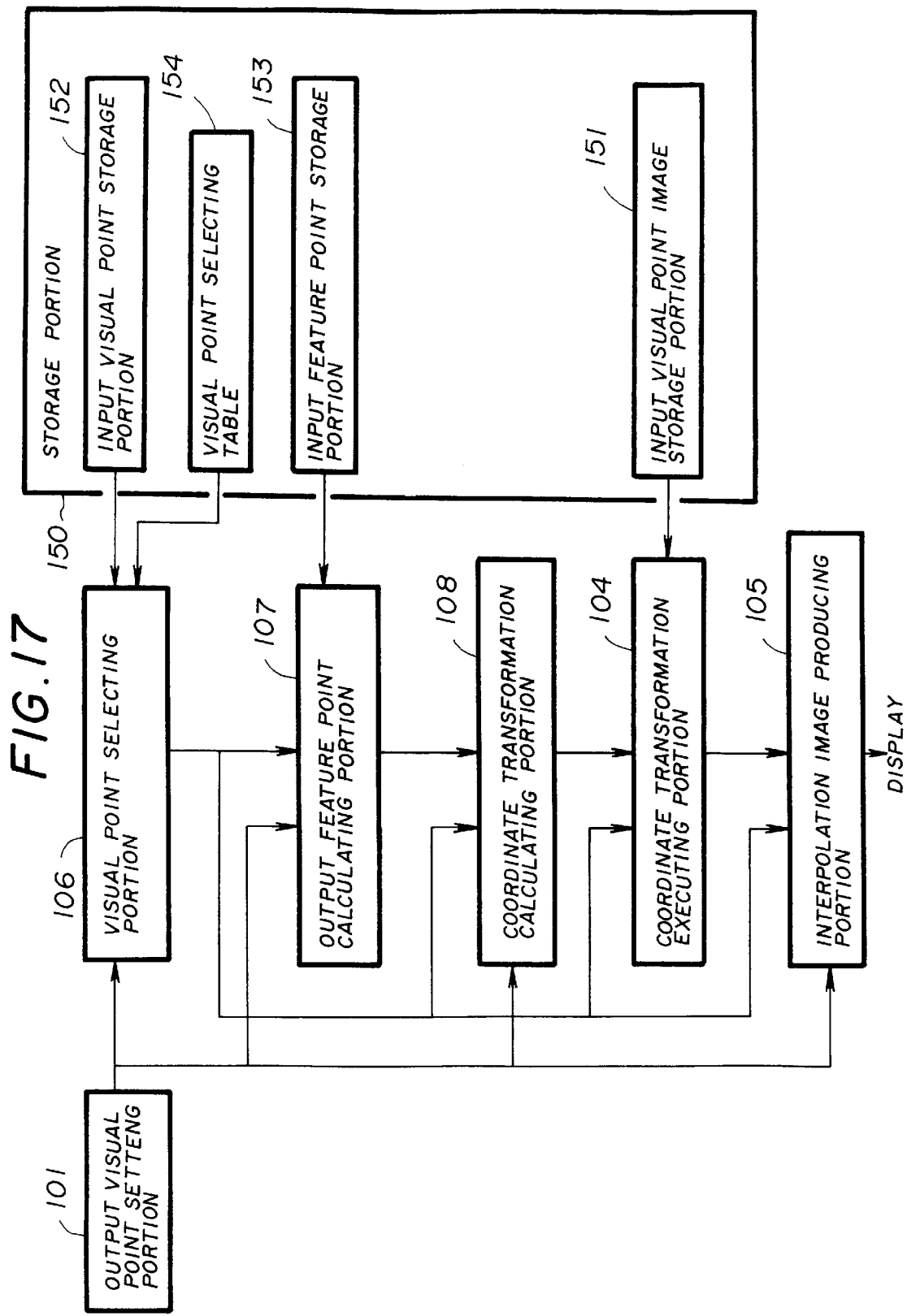
FIG. 17 is a block diagram illustrating a third example of the functional constitution of the image production processing apparatus.

The image production processing apparatus 100 may be formed as shown in FIG. 17. In FIG. 17, those parts which are the same as those shown in FIG. 15 are given the same reference numbers.

In this example, an output feature point calculating portion 107 carries out an estimating calculation for estimating feature points (output feature points) on an body image from a visual point specified by the user based on corresponding feature points (input feature points) set on the body images from the respective selected visual points. The output feature point calculating portion 107 is embodied by a process executed by the CPU 10 in accordance with the programs. Based on relationships between the feature points set on the body images from the respective selected visual points and corresponding feature points on the body image from the specified visual point, a coordinate transformation calculating portion 108 calculates coordinate transformation equations used to transform the body images from the respective selected visual points into the body image from the specified visual point.

For example, M feature points (the input feature points) are set on each of the body images from the visual points A, B and C selected by the visual point selecting portion 106. That is, feature points (xa1, ya1), (xa2, ya2), ..., and (xaM, yaM) are set on the body image from the visual point A, feature points (xb1, yb1), (xb2, yb2), ..., and (xbM, ybM) are set on the body image from the visual point B, and feature points (xc1, yc1), (xc2, yc2), ..., and (xcM, ycM) are set on the body image from the visual point C.

The output feature point calculating portion 107 receives a visual point V specified by the user and calculates the weights $\alpha$, $\beta$ and $\tau$ in accordance with the equations (4). Using the weights $\alpha$, $\beta$ and $\tau$, a position (xvi, yvi) of an i-th feature point, corresponding to the i-th feature point set on each of the body image from the selected visual points A, B and C, on the body image from the specified visual point V is calculated in accordance with the following equations (8).

$$xvi = \alpha xai + \beta xbi + \tau xci \, (i=1, 2, \ldots, M)$$
$$yvi = \alpha yai + \beta ybi + \tau yci \, (i=1, 2, \ldots, M) \qquad (8)$$

Although all feature points on the body images from the respective visual points are not necessarily seen, the above process is applied to only feature points which are commonly seen on the body images from the respective visual points.

The coordinate transformation calculating portion 108 calculates coordinate transformation equations to transform the body images from the selected visual points to the body image from the specified visual point V. This calculation is performed using information about M feature points set on each of the body images from the respective visual points A, B, C selected by the visual point selecting portion 106, the visual point V set by the visual point setting portion 101, and the feature points calculated by the output feature point calculating portion 107.

The description has been given of the process (in accordance with three methods), in the coordinate transformation calculating portion 103 shown in FIG. 6, for calculating the coordinate transformation equations (1) to transform the body image from the visual point A into the body image from the visual point B based on the relationships between feature points set on the respective body images. In the same manner as this process, a coordinate transformation equation to transform the body image from the visual point A into the body image from the visual point V is calculated based on relationships between the feature points (the input feature points) set on the body image from the visual point A and the feature points (the output feature points) calculated by the output feature point calculating portion 107. As a result, the following coordinate transformation equations having the same format as the coordinate transformation equations (1) are obtained.

$$xv=fav(xa, ya), yv=gav(xa, ya)$$

In the same manner, coordinate transformation equations to transform the body images from the other selected visual points B and C into the body image from the visual point V as follows.

$$xv=fbv(xb, yb), yv=gbv(xb, yb)$$

$$xv=fcv(xc, yc), yv=gcv(xc, yc)$$

The coordinate transform equations, obtained as described above, to transform the body images from the respective selected visual points A, B and C into the body image from the visual point specified by the user are supplied to the coordinate transformation executing portion 104. In the coordinate transformation executing portion 104, body images IVa, IVc and IVc are respectively calculated from the body images IA, IB and IC from the respective visual points A, B and C in accordance with the above coordinate transformation equations in the same manner as in the case described above.

In the above example, from the feature points set on each of the body image from the selected visual points, corresponding feature points on the body image from the visual points V specified by the user calculated. Based on the relationships among the corresponding feature points, the coordinate transformation equations to transform the body image from the respective visual points into the body image from the visual point specified by the user is then calculated. As a result, the coordinate transformation equations can be accurately calculated.

The output feature point calculating portion 107 can calculate the feature points (the output feature point) on the body image from the visual point specified by the user in accordance with the following process.

In the same manner as in the previous case, the visual point selecting portion 106 selects the visual points A, B and C. Feature points set on the body image from the selected visual point A are identified by (xa1, ya1), (xa2, ya2), . . . , and (xaM, yaM). Corresponding feature points set on the body image from the selected visual point B are identified by (xb1, yb1), (xb2, yb2), . . . , and (xbM, ybM). Corresponding feature points set on the body image from the selected visual point C are identified by (xc1, yc1), (xc2, yc2), . . . , and (xcM, ycM). In addition, the user specifies a visual point V.

Under the above conditions, the output feature point calculating portion 107 calculates coefficients $\alpha_{11}$, $\alpha_{12}$, $\alpha_{21}$, $\alpha_{22}$, $\beta_{11}$, $\beta_{12}$, $\beta_{22}$, $\tau_{11}$, $\tau_{12}$, $\tau_{21}$ and $\tau_{22}$ of the affine transformation in accordance with a procedure which will be described later. Using these coefficients, a position (xvi, yvi) of a corresponding feature point on the body image from the visual point V specified by the user is calculated in accordance with the following equations (9).

$$xvi=\alpha_{11}xai+\alpha_{12}yai+\beta_{11}xbi+\beta_{12}ybi+\tau_{11}xci+\tau_{12}yci$$

$$yvi=\alpha_{21}xai+\alpha_{22}yai+\beta_{21}xbi+\beta_{22}ybi+\tau_{21}xci+\tau_{22}yai \quad (9)$$

The respective coefficients $\alpha_{11}$, $\alpha_{12}$, $\alpha_{21}$, $\alpha_{22}$, $\beta_{11}$, $\beta_{12}$, $\beta_{22}$, $\tau_{11}$, $\tau_{12}$, $\tau_{21}$ and $\tau_{22}$ of the affine transformation are calculated as follows.

In FIG. 12, the position vectors Qa, Qb and Qc represent the selected visual points A, B and C, and the position vector Qv represents the specified visual point V. Normalized vectors ua, ub, uc and uv are obtained by normalizing the above position vectors so that the length is equal to "1". A unit vector σ which is directed to the North Pole is defined.

The following determinant M of 3×3 is defined.

$$M=\{(1-ua\ ua^t)+(1-ub\ ub^t)+(1-uc\ uc^t)\}^{-1} \quad (10)$$

In the above determinant M, "$t$" represents a transposing operation. The respective coefficients of the affine transformation are calculated in accordance with the following equations.

$$\alpha_{11}=(\eta\times uv \cdot M\eta\times ua)/\{|\eta\times uv|\ |\eta\times ua|\}$$
$$\alpha_{12}=(\eta\times uv \cdot Mua\times\eta\times ua)/\{|\eta\times uv|\ |\eta\times ua|\}$$
$$\alpha_{21}=(uv\times\eta\times uv \cdot M\eta\times ua)/\{|\eta\times uv|\ |\eta\times ua|\}$$
$$\alpha_{22}=(uv\times\eta\times uv \cdot Mua\times\eta\times ua)/\{|\eta\times uv|\ |\eta\times ua|\}$$
$$\beta_{11}=(\eta\times uv \cdot M\eta\times ub)/\{|\eta\times uv|\ |\eta\times ub|\}$$
$$\beta_{12}=(\eta\times uv \cdot Mub\times\eta\times ub)/\{|\eta\times uv|\ |\eta\times ub|\}$$
$$\beta_{21}=(uv\times\eta\times uv \cdot M\eta\times ub)/\{|\eta\times uv|\ |\eta\times ub|\}$$
$$\beta_{22}=(uv\times\eta\times uv \cdot Mub\times\eta\times ub)/\{|\eta\times uv|\ |\eta\times ub|\}$$
$$\tau_{11}=(\eta\times uv \cdot M\eta\times uc)/\{|\eta\times uv|\ |\eta\times uc|\}$$
$$\tau_{12}=(\eta\times uv \cdot Muc\times\eta\times uc)/\{|\eta\times uv|\ |\eta\times uc|\}$$
$$\tau_{21}=(uv\times\eta\times uv \cdot M\eta\times uc)/\{|\eta\times uv|\ |\eta\times uc|\}$$
$$\tau_{22}=(uv\times\eta\times uv \cdot Muc\times\eta uc)/\{|\eta\times uv|\ 51\ \eta\times uc|\} \quad (11)$$

The determinant M of 3×3 is calculated in accordance with the above equation (10). Using the solution of the determinant M, the respective coefficients of the affine transformation are calculated in accordance with the above equations (11).

Using the coefficients of the affine transformation which are calculated as described above, positions of the feature points on the body image from the visual point V specified by the user are calculated in accordance with the equation (9).

According to the above process in the output visual point calculating portion 107, since positions of the feature points (the output feature points) on the body image from the visual point V specified by the user are calculated using a large number of parameters, accurate positions of the feature points can be obtained.

Figure 18:
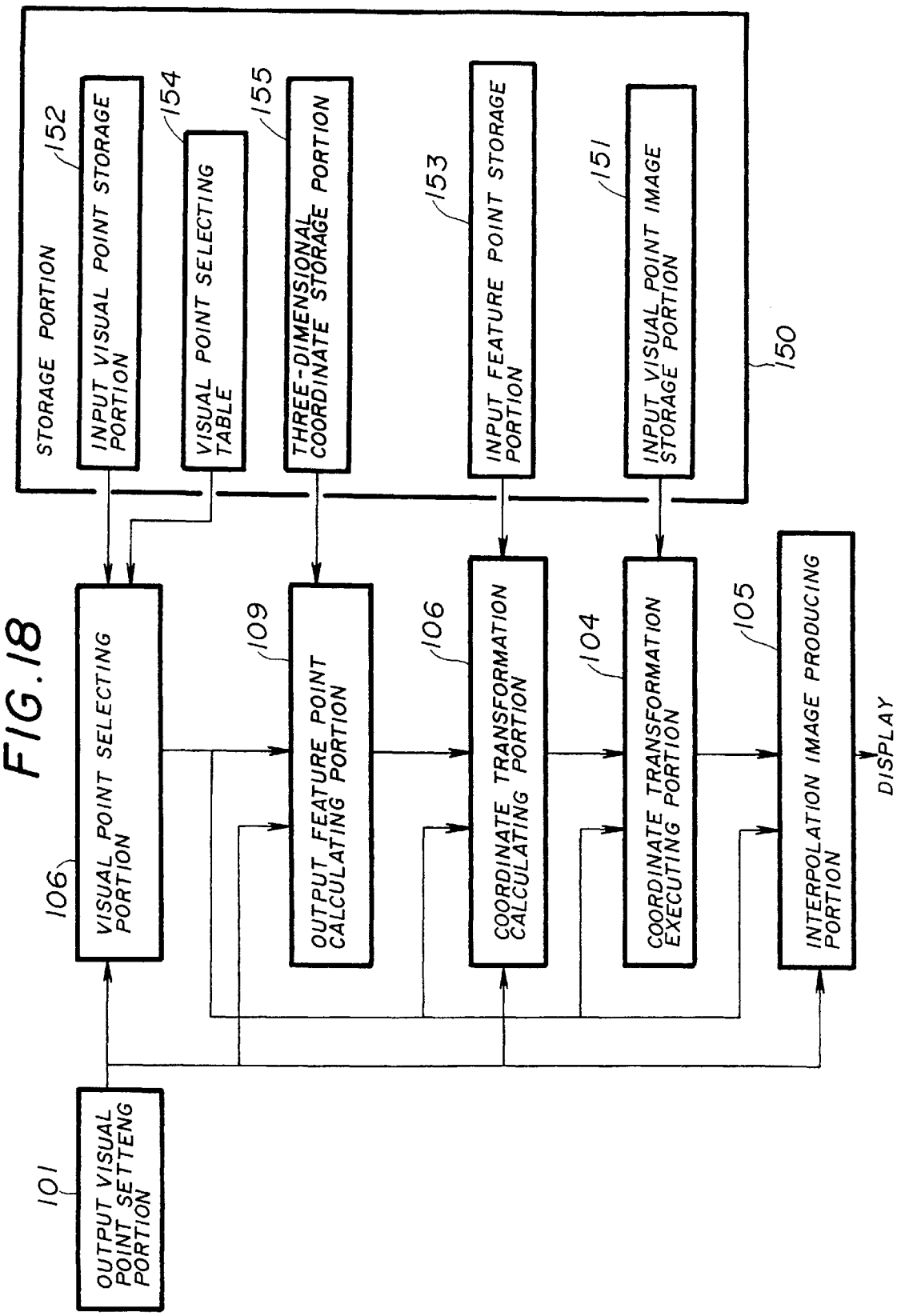
FIG. 18 is a block diagram illustrating a fourth example of the functional constitution of the image production processing apparatus.

The image production processing apparatus 100 may be formed as shown in FIG. 18. In FIG. 18, those parts which are the same as those shown in FIG. 17 are given the same reference numbers.

In this example, a three-dimensional coordinate storage portion 155 is added to the structural data storage portion 150 formed in the .external storage unit 13. The three-dimensional coordinate storage portion 155 stores points on the actual body each of which points corresponds to one of the feature points set on each of the body images from the respective visual points. An output feature point calculating portion 109 calculates the feature points on the body image from the visual point V specified by the user based on three-dimensional coordinates of the points on the body stored in the three-dimensional coordinate storage portion 155.

Three-dimensional coordinate (X, Y, Z) of each of the points, on the body, corresponding to the feature points is stored in the three-dimensional coordinate storage portion 155 in a manner as shown in FIG. 19. A coordinate system X-Y-Z used to represent three-dimensional coordinates may be arbitrarily set in a space in which the body is located. The three-dimensional coordinates can be measured or calculated by the structural data generating apparatus 200. In this case, information of the three-dimensional coordinates are supplied to the image production processing apparatus 100 along with other items (the body images from the respective visual points, the feature points on the body images and the like) of the structural data using the recording medium (e.g., the CD-ROM) or via the communication line.

The output feature point calculating portion 109 calculates feature points on the body image from the visual point V specified by the user, based on the three-dimensional coordinates of the points on the body stored in the three-dimensional coordinate storage portion 155. Actually, points, in a three-dimentional space, corresponding to the feature points are projected on an image plane, so that the feature points on the body image from the specified visual point V are calculated. There are two types of projection methods: the orthogonal projection method and the perspective projection method.

First, a process for calculating feature points in accordance with the orthogonal projection method is carried out as follows.

Figure 20:
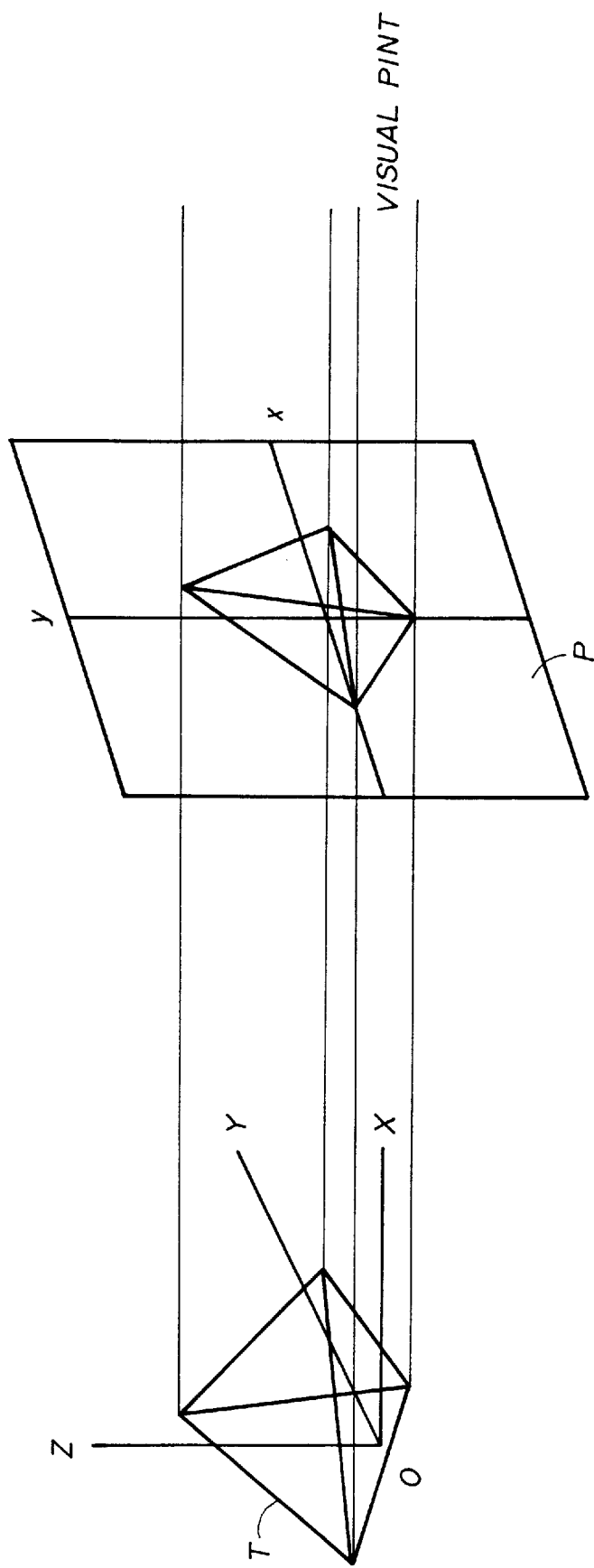
FIG. 20 is a diagram illustrating an orthogonal projection method.

As shown in FIG. 20, the body T is located near the origin O of a three-dimensional space (a three-dimensional coordinate system X-Y-Z). Points on the body T corresponding to feature points (the input feature points) are projected in a direction parallel to a line between the origin O and the visual point. The points are projected on an image plane P which is perpendicular to the line between the origin O and the visual point. Positions of points on the image plane P at which lines extending from the points on the body T in the direction parallel to the line between the origin O and the visual point intersect are defined as position of the output feature points.

A three-dimensional position vector of a point on the body T corresponding to the m-th feature point is represented by $Rm=(Xm, Ym, Zm)^T$.

A position vector of the n-th visual point is represented by Qn, a unit vector in a X-axis on the image plane P is represented by im, and a unit vector in a Y-axis on the image plane is represented by jm. In this case, coordinates (xnm, ynm) of the m-th feature point with respect to the n-th visual point are calculated as $xnm=(in, Rm)$ and $ynm=(jn, Rm)$.

Next, a process for calculating feature points in accordance with the perspective projection method is carried out as follows.

Figure 21:
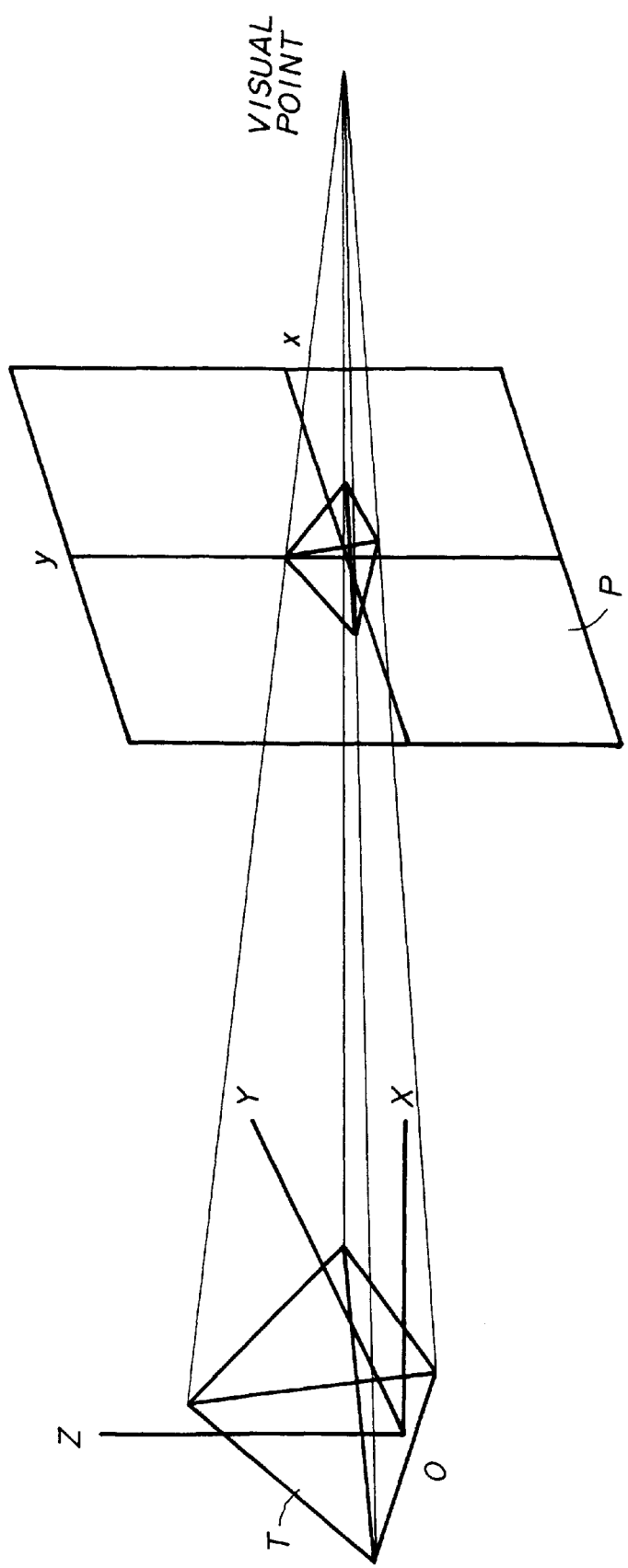
FIG. 21 is a diagram illustrating a perspective projection method.

As shown in FIG. 21, the body T is located near the origin O of the three-dimensional space (the three-dimensional system X-Y-Z). Points on the body T corresponding to the respective feature points (the input feature points) are projected toward the visual point. The points are projected on an image plane P which is perpendicular to a line between the origin 0 and the visual point. Position of points on the image plane P at which lines extending from the points on the body toward the visual point intersect are defined as positions of the output feature points. In the same manner as the case of the orthogonal projection method, the position vectors Rm and Qn and the unit vectors in and jn are defined. Coordinates (xnm, ynm) of the m-th feature point with respect to the n-th visual point are calculated as $xnm=f(in, Rm-Qn)/(in \times jn, Rm-Qn)$ and $ynm=f(jn, Rm-Qn)/(in \times jn, Rm-Qn)$.

As has been described above, the output feature point calculating portion 109 projects points on the body T corresponding to the respective feature points on the image plane P depending on the visual point specified by the user and calculates the positions of the output feature points. Thus, accurate position of the output feature points can be obtained.

Figure 22:
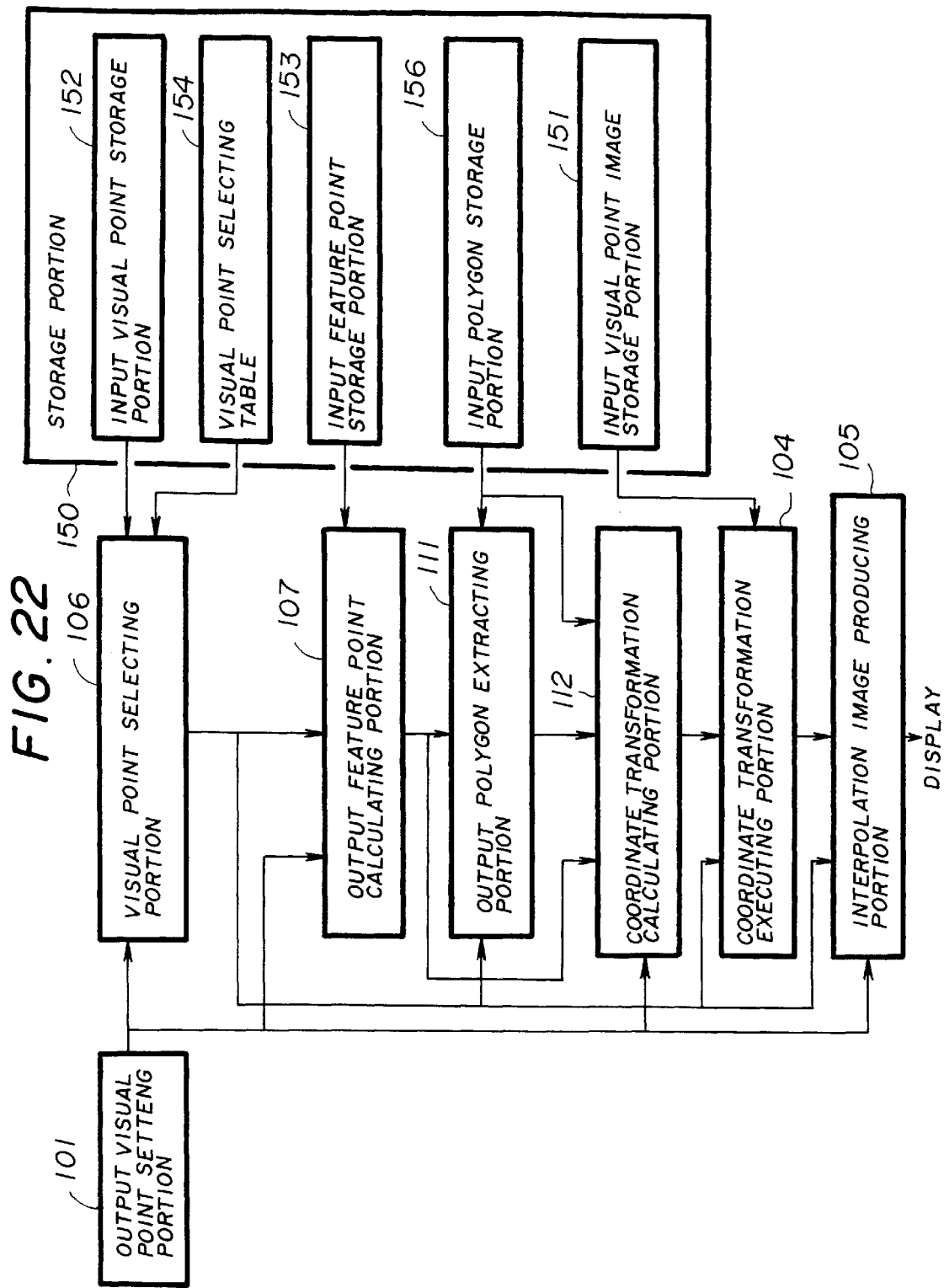
FIG. 22 is a block diagram illustrating a fifth example of the functional constitution of the image production processing apparatus.

The image production processing apparatus 100 may be formed as shown in FIG. 22. In FIG. 22, those parts which are the same as those described in the above examples are given the same reference numbers.

In this example, the structural data storage portion 150 formed in the external storage unit 13 has, in the same manner as that shown in FIG. 17, the input visual point image storage portion 151, the input visual point storage portion 152, the input feature point storage portion 153 and the visual point selecting table 154. The structural data storage portion 150 further has an input polygon storage portion 156.

The body image from each of the visual points is covered with a plurality of polygons each of which has, as vertexes, feature points set on the body image. Sets of the feature points which are the vertexes of the polygons are stored in the input polygon storage portion 156 so as to correspond to the polygons. The feature points set on each of the body image from the respective visual points are divided into sets each of which includes feature points as the vertexes of one of the polygons.

For example, as shown in FIGS. 10A, 10B and 10C, each of the body images IA, IB and IC from the visual points A, B and C is covered with triangles each of which has feature points as the vertexes. Sets of the feature points which are the vertexes of the triangles are stored in the input polygon storage portion 156 as shown in FIG. 23. In this example, in a case where a set of feature points (1, 2, 6) on a body image is a set of vertexes of a triangle, with respect to all the body images including the feature points 1, 2 and 6, the feature points are divided into sets so that the feature points 1, 2 and 6 forms a set and are vertexes of a triangle. Referring to FIG. 23, a triangle 1 in which the feature points 1, 2 and 6 are the vertexes of the triangle 1 and a triangle L in which feature points 7, 8 and 9 are vertexes of the triangle L are not seen from the visual point 2.

As has been described above, there may be a case where a feature point included in a body image is not included in another body image. Such a feature point is omitted from feature points to set on the body images from the respective visual points.

For example, as shown in FIGS. 11A, 11B and 11C, each of the body images IA, IB and IC from the visual points A, B and C is covered with quadrangles each of which has feature points as the vertexes. Sets of the feature points which are the vertexes of the quadrangles are stored in the input polygon storage portion 156 as shown in FIG. 24. In this example, in a case where a set of feature points (1, 2, 5, 6) on a body image is a set of vertexes of a quadrangle, with respect to all the body images including the feature points 1, 2, 5 and 6, the feature points are divided into sets so that the feature points 1, 2, 5 and 6 form a set and are vertexes of a quadrangle. Referring to FIG. 24, a quadrangle 1 in which the feature points 1, 2, 5 and 6 are the vertexes of the quadrangle 1 and a quadrangle L in which feature points 7, 8, 9 and 10 are vertexes of the triangle L are not seen from the visual point 2.

The sets of feature points which should be stored in the input polygon storage portion 156 as the vertexes of the polygons covering the body images from the respective visual points can be made along with other items (the body images, the feature points and the like) of the structural data by the structural data generating apparatus 200. In this case, the data of the sets of feature points are supplied to the image production processing apparatus 100 using the recording medium (e.g., the CD-ROM) or via the communication line.

In this example, the image production processing apparatus 100 further has an output polygon extracting portion 111. The output polygonal extracting portion 111 is embodied by a process which is performed by the CPU 10 in accordance with the programs.

The output feature point calculating portion 107 calculates the features points on the body image from the specified visual point as described above. The output polygon extracting portion 111 then extracts a plurality of polygons, covering the body image from the virtual point V, from the feature points calculated by the output feature point calculating portion 107. The polygons extracted by the output polygon extracting portion 111 correspond to the polygons (e.g., the triangles 1 to L shown in FIG. 23) stored in the input polygon storage portion 156.

A coordinate transformation calculating portion 112 calculates coordinate transformation equations used to transform the respective polygons formed of sets of the feature points stored in the input polygon storage portion 156 into corresponding polygons extracted by the output polygon extracting portion 111. The respective polygons are stored in the input polygon storage unit so as to correspond to the visual points selected by the visual point selecting portion 106.

For example, the visual point selecting portion 106 selects the visual points A, B and C and the visual point V is specified by the user. In this case, the coordinate transformation equations to transform the body image from the visual point A into the body image from the visual point V are calculated as follows. As to the visual points B and C, the coordinate transformation equations are obtained in the same manner as in the case of the visual point A.

As has been described with reference to FIGS. 10A, 10B, 10C, 11A, 11B and 11C, based on relationships between the polygons, the coordinate transformation equations to transform the body image from the visual point A into the body image from the visual point B are obtained as $xb=fab(xa, ya)$ and $yb=gab(xa, ya)$.

Using these relationships, the coordinate transformation equations to transform the body image from the visual point A to the body image from the visual point V are obtained as $xv=fav(xa, ya)$ and $yv=gav(xa, ya)$.

Figure 25:
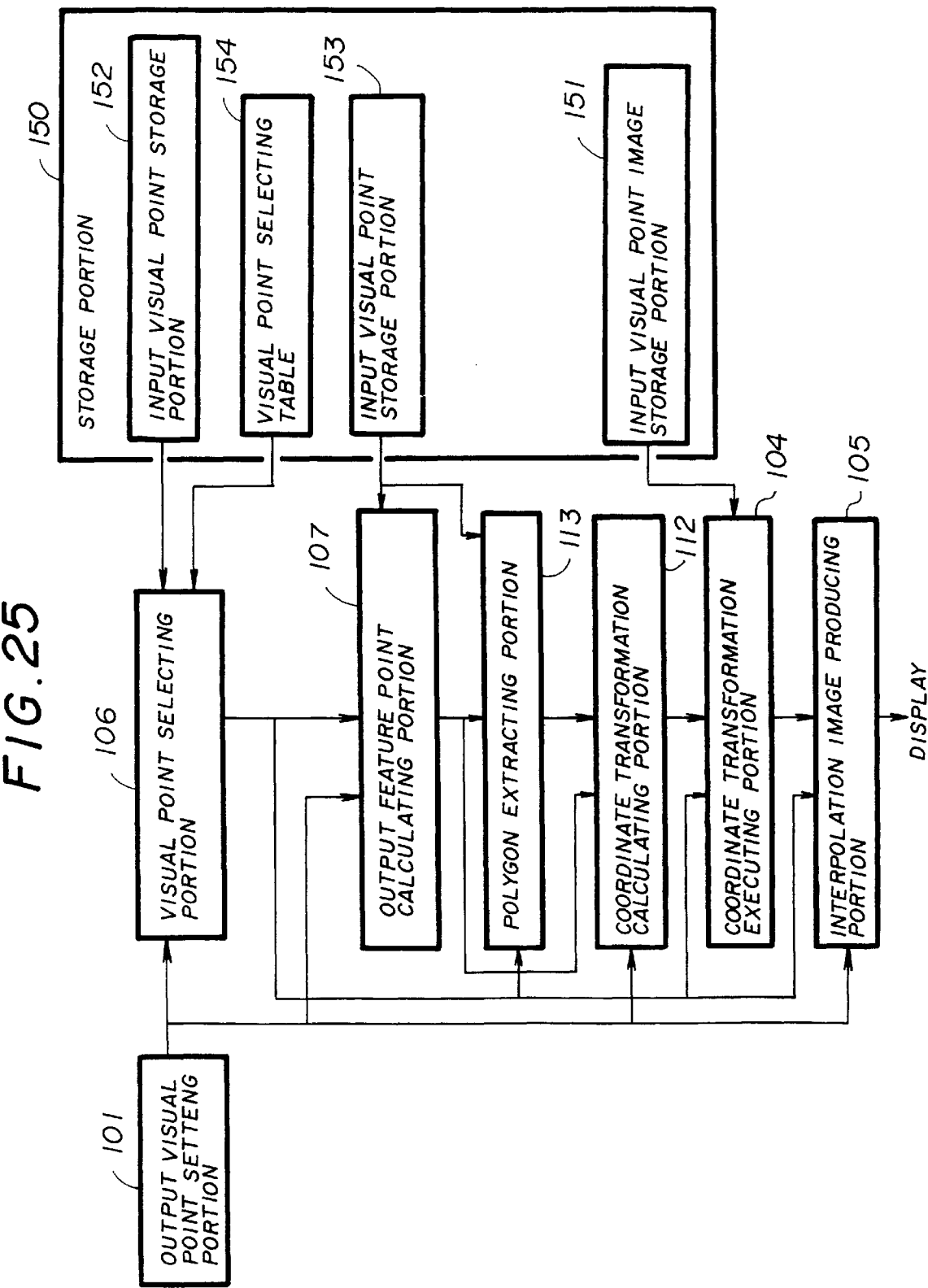
FIG. 25 is a block diagram illustrating a sixth example of the functional constitution of the image production processing apparatus.

A polygon extracting portion 113 shown in FIG. 25 can be substituted for the input polygon storage portion 156 and the polygon extracting portion 111 both of which are shown in FIG. 22. In FIG. 25, those parts which are the same as those shown in FIG. 22 are given the same reference numbers.

The polygon extracting portion 113 extracts sets of feature points which are vertexes of polygons covering the body image from the visual point, the polygons corresponding to polygons having the feature points, as the vertexes, stored in the input feature point storage portion 153. The feature points stored in the input feature point storage portion 153 correspond to the respective visual points selected by the visual point selecting portion 106. Corresponding feature points on the body images from each of the visual points are divided into sets so that feature points included in each of sets are vertexes of a polygon. That is, the polygon extracting portion 113 extracts polygons in each of which feature points set on the body image from each of the visual points selected by the visual point selecting portion 106 are the vertexes (see FIGS. 10A, 10B, 10C, 11A, 11B and 11C). Polygons in each of which feature points calculated by the output feature point calculating portion 107 are the vertexes, which polygons correspond to the polygons extracted based on the input feature points, are further extracted by the polygon extracting portion 113. The body image from the output visual point V is covered with the polygons in each of which the feature points are calculated by the output feature point calculating portion 107.

In accordance with the relationships between the extracted polygons covering the body images from the respective visual points and the polygons covering the body image from the visual point specified by the user, the coordinate transformation calculating portion 112 calculates the coordinate transformation equations in the same manner as in the case shown in FIG. 22.

Figure 26:
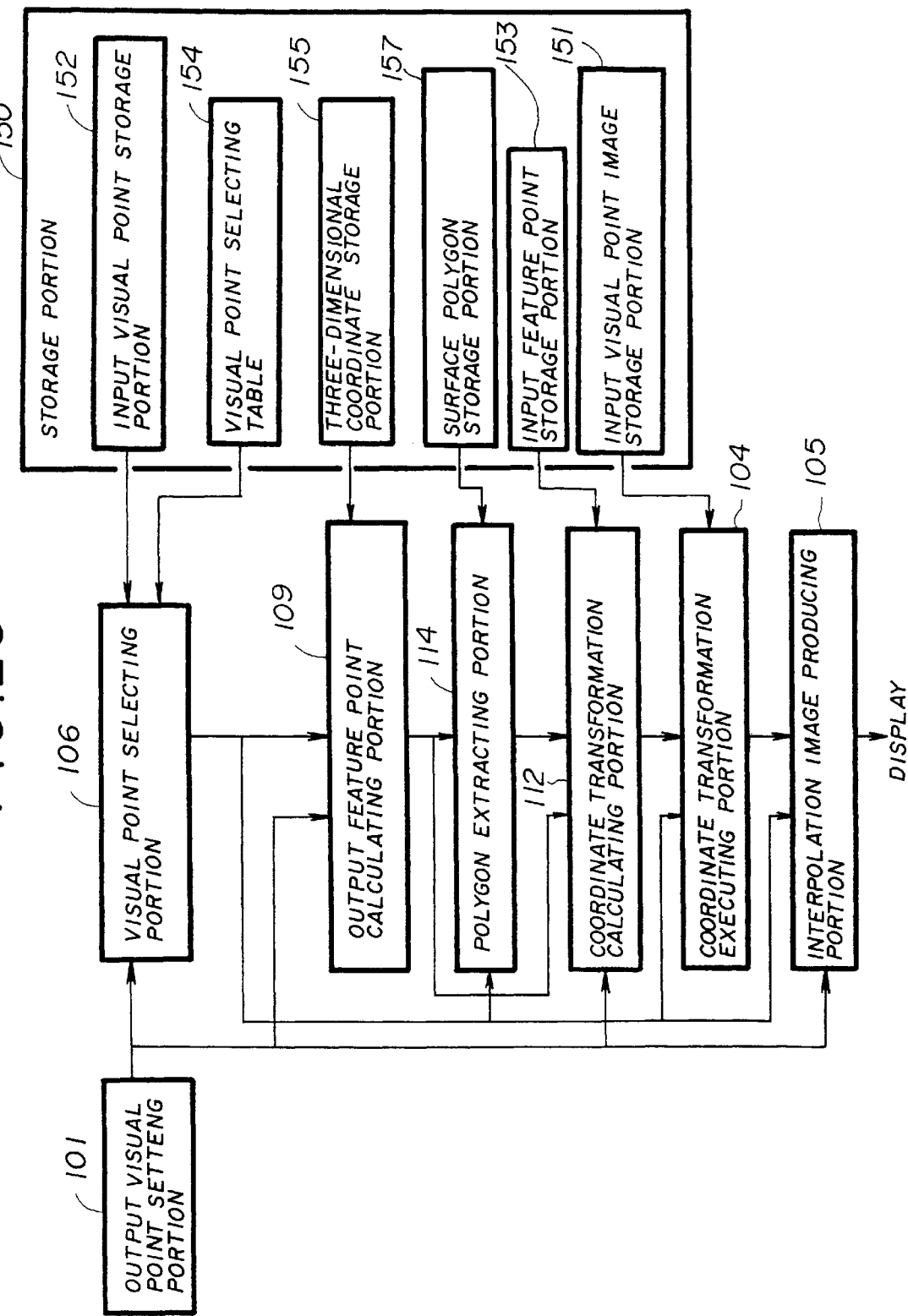
FIG. 26 is a block diagram illustrating a seventh example of the functional constitution of the image production processing apparatus.

The image production processing apparatus 100 in which the coordinate transformation equations are calculated using the polygons having feature points set on the body images from the respective visual points as the vertexes may be formed as shown in FIG. 26. In FIG. 26, those parts which are the same as those shown in FIGS. 18 and 25 are given the same reference numbers.

In this example, the structural data storage portion 150 formed in the external storage unit 13 has the input visual point storage portion 151, the input visual point storage portion 152, the input feature point storage portion 153, the visual point selecting table 154 and the three-dimensional coordinate storage portion 155 in the same manner in the case shown in FIG. 18. The structural data storage portion 150 further has a surface polygon storage portion 157.

The three-dimensional coordinate storage portion 155 stores, as described with reference to FIG. 18, three-dimensional coordinates representing points on the body corresponding to the feature points on the body image from each of the visual points. The surface polygon storage portion 157 stores polygons in each of which the points represented by the coordinates stored in the three-dimensional coordinates storage portion 155 are the vertexes. The surface of the body is covered with the polygons stored in the surface polygon storage portion 157.

For example, in a case where the body is covered with triangles in each of which points corresponding to the feature points in the three-dimensional space are the vertexes, the surface polygon storage portion 157 stores, as shown in FIG. 27, sets of points which are vertexes of triangles covering the surface of the body. In this case shown in FIG. 27, the surface of the body is covered with L triangles. In the first triangle 1, points on the surface of the body corresponding to the feature points 1, 2, and 6 are vertexes. In the second triangle 2, points on the surface of the body corresponding to the feature points 2, 5 and 6 are vertexes. In the L-th triangle L, points on the surface of the body corresponding to the feature points 7, 8 and 9 are vertexes.

In addition, for example, in a case where the body is covered with quadrangles in each of which points corresponding to the feature points in the three-dimensional space are vertexes, the surface polygon storage portion 157 stores, as shown in FIG. 28, sets of points which are vertexes of quadrangles covering the surface of the body. In this case shown in FIG. 28, the surface of the body is covered with L quadrangles. In the first quadrangle 1, points on the surface of the body corresponding to the feature points 1, 2, 5 and 8 are vertexes. In the second quadrangle 2, points on the surface of the body corresponding to the feature points 2, 3, 4 and 5 are vertexes. In the L-th quadrangle L, points on the surface of the body corresponding to the feature points 7, 8, 9 and 10 are vertexes.

The sets of vertexes of the polygons covering the surface of the body which should be stored in the surface polygon storage portion 157 can be made by the structural data generating apparatus 200 along with other items (the body images, the feature points and the like) of the structural data. In this case, the data representing the sets of vertexes of the polygons is supplied to the image production processing apparatus 100 using the recording medium (e.g., the CD-ROM) or via the communication line.

The image production processing apparatus 100 in this embodiment further has a polygon extracting portion 114. The polygon extracting portion 114 is embodied by a process which is performed by the CPU 10 in accordance with the programs. The polygon extracting portion 114 extracts polygons in each of which the feature points on the body image from each of the visual points are vertexes selected by the visual point selecting portion 106. The vertexes correspond to vertexes of each of polygons covering the body which are stored in the surface polygon storage portion 157. The polygon extracting portion 114 further extracts polygons in which the feature points, calculated by the output feature point calculating portion 109, on the body image from the visual point V specified by the user.

For example, in a case where the visual point selecting portion 106 selects visual points A, B and C, sets of feature points set on the body image from the visual point A with reference to information stored in the input feature point storage portion 151. Polygons in each of which points corresponding to the feature points set on the body image from the visual point A are vertexes are selected from among the polygons stored in the surface polygon storage portion 157.

The polygon extracting portion 114 outputs the selected polygons as a group of polygons related to the visual point A. The polygon extracting portion 114 outputs groups of polygons related to the respective visual points B and C in the same manners as in the case of the visual points A. Further, the polygon extracting portion 114 outputs a plurality of polygons commonly included in the groups of polygons related to the visual points A, B and C as a group of polygons related to the visual point (the output visual pint) specified by the user.

Figure 29:
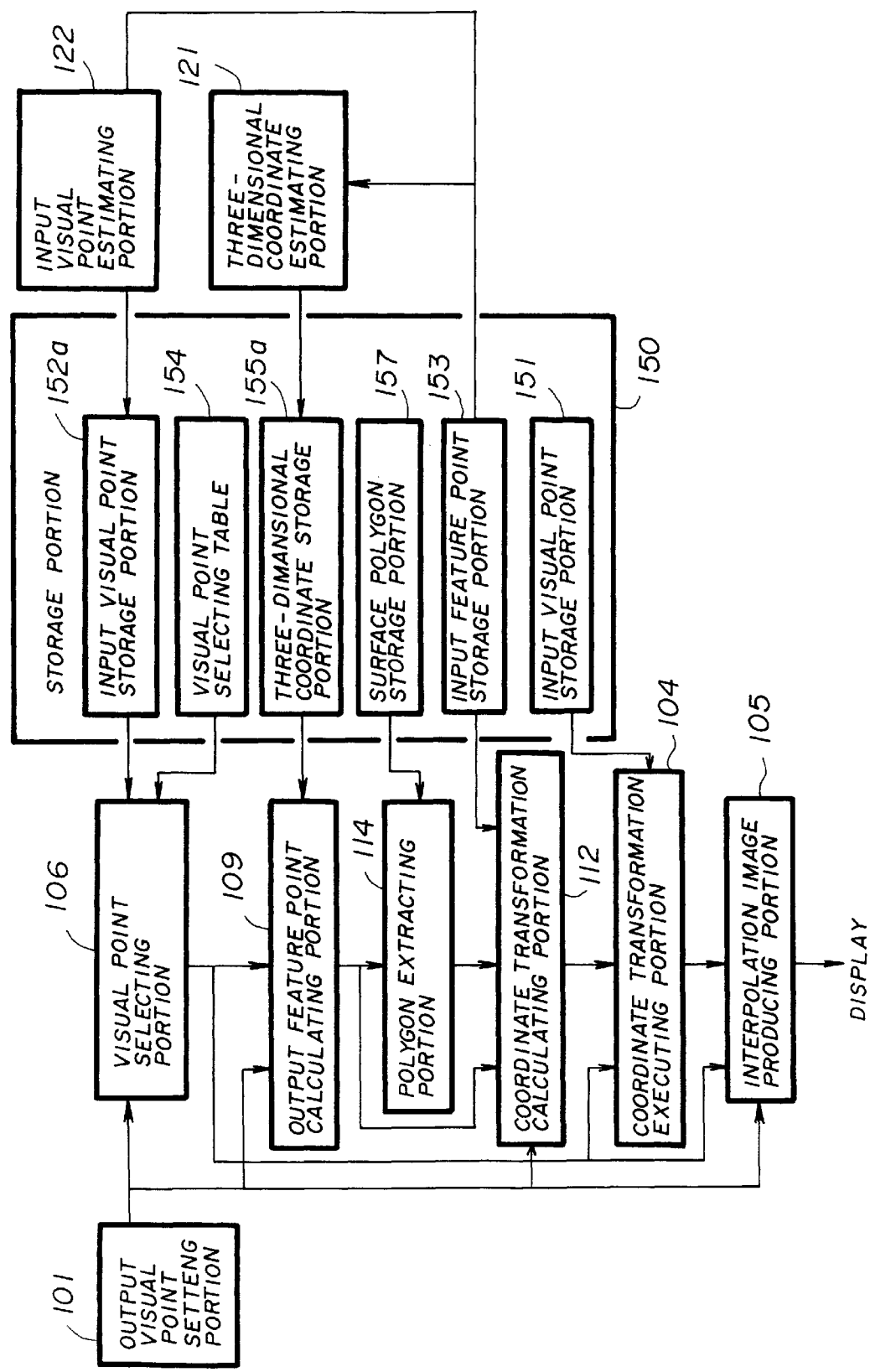
FIG. 29 is a block diagram illustrating a eighth example of the functional constitution of the image production processing apparatus.

The image production processing apparatus 100 may be formed as shown in FIG. 29. In FIG. 29, those parts which are the same as those shown in FIG. 26 are given the same reference numbers.

In this example, the image production processing apparatus 100 generates data of visual points (input visual point) to be stored in an input visual point storage portion 152a and three-dimensional coordinates of points on the body corresponding to the feature points which are to be stored in a three-dimensional coordinate storage portion 155a. That is, the image production processing apparatus 100 has a three-dimensional coordinate estimating portion 121 and an input visual point estimating portion 122. The three-dimensional coordinate estimating portion 121 estimates, based on the data of the feature points stored in the input feature point storage portion 151, three-dimensional coordinates of points on the body corresponding to the feature points. The input visual point estimating portion 122 estimates, based on the data of the feature points, data representing the respective visual points.

The three-dimensional coordinate estimating portion 121 and the input visual point estimating portion 122 are embodied by processes of CPU 10 in accordance with programs.

The input feature point storage portion 151 stores, as shown in FIG. 9, coordinates (xmn, ynm) of the m-th feature point set on the body image from the n-th visual point. Supposing the orthogonal projection method (see FIG. 20), coordinates of the feature point are obtained as $$xmn=(in, Rm) \text{ and } ynm=(jn, Rm) \tag{12}$$

as described above. On the other hand, supposing the perspective projection method (see FIG. 21), coordinates of the feature point are obtained as $$xnm=f(in, Rm-Qn)/(in \times jn, Rm-Qn) \text{ and}$$

$$ynm=f(jn, Rm-Qn)/(in \times in, Rm-Qn) \tag{13}$$

as described above. In the above equations (12) and (13), Rm is a vector representing three-dimensional coordinates of the m-th feature point and Qn is a vector representing a position of the n-th visual point. In addition, in and jn are vectors in the X and Y directions on the image plane. It is generally know that Rm, Qn, in and jn can be obtained by solving the above equations (12) and (13) in a case where n and m are relatively large.

Thus, the three-dimensional coordinate estimating portion 121 calculates, in accordance with the above know method, the vector Rm representing a position on the body corresponding to the m-th feature point from the coordinates (xnm, ynm) of the feature point. In addition, the input visual point estimating portion 122 calculates, in accordance with the know method, the vectors Qn, in and jn representing the visual point from the coordinates (xnm, ynm) of the feature point.

The structural data generating apparatus 200 which generates all or a part of the structural data used in the image production processing apparatus 100 as described above may be formed using a normal computer system. In this case, the structural data generating apparatus 200 has a hardware constitution as shown in FIG. 30.

Figure 30:
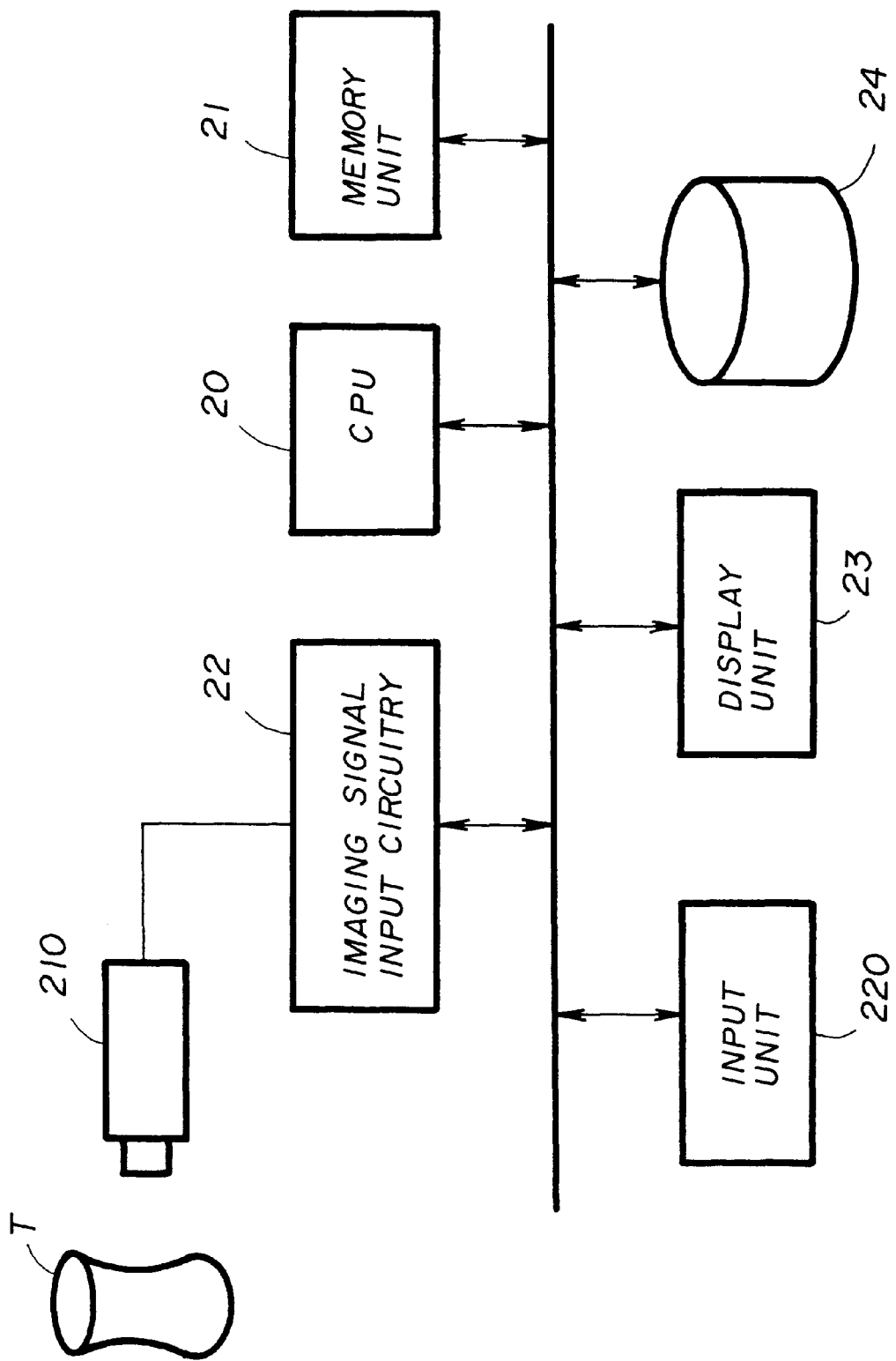
FIG. 30 is a block diagram illustrating an example of hardware of the structural data generating apparatus.

Referring to FIG. 30, this system has a CPU (Central Processing Unit) 20, a memory unit 21, an imaging signal input circuitry 22, a display unit 23 and an external storage unit 24 all of which are connected by a bus. In addition, an input unit 220 used to specify various kinds of information and positions are connected to the bus.

The CPU 20 executes various processes in accordance with programs stored in the memory unit 21. The memory unit 21 has a ROM (Read Only Memory) and a RAM (Random Access Memory). The memory unit 21 stores programs corresponding to various processes and various types of data obtained in the executed processes. The memory unit 21 is further used as an image memory which stores image data (a bit map) to be displayed on the display unit 23. The input unit 220 has a keyboard and a mouse and is used to input information required for processes and specify feature points. The external storage unit 24 is, for example, a hard disk unit.

A camera 210 takes pictures of the body from various visual points. Imaging signals output from the camera 210 are supplied to the imaging signal input circuitry 22. The imaging signal input circuitry 22 converts the imaging signals from the camera 210 into image data, and the image data is then supplied to the bus. The image data is expanded on the image memory of the memory unit 21 under control of the CPU 20. The image data expanded on the image memory can be stored as a file in the external storage unit 24.

Programs capable of being executed by the CPU 20 are stored in the ROM of the memory unit 21. When the structural data generating apparatus 200 is turned on, the CPU 20 starts to execute processes in accordance with the programs stored in the memory unit 21.

Figure 31:
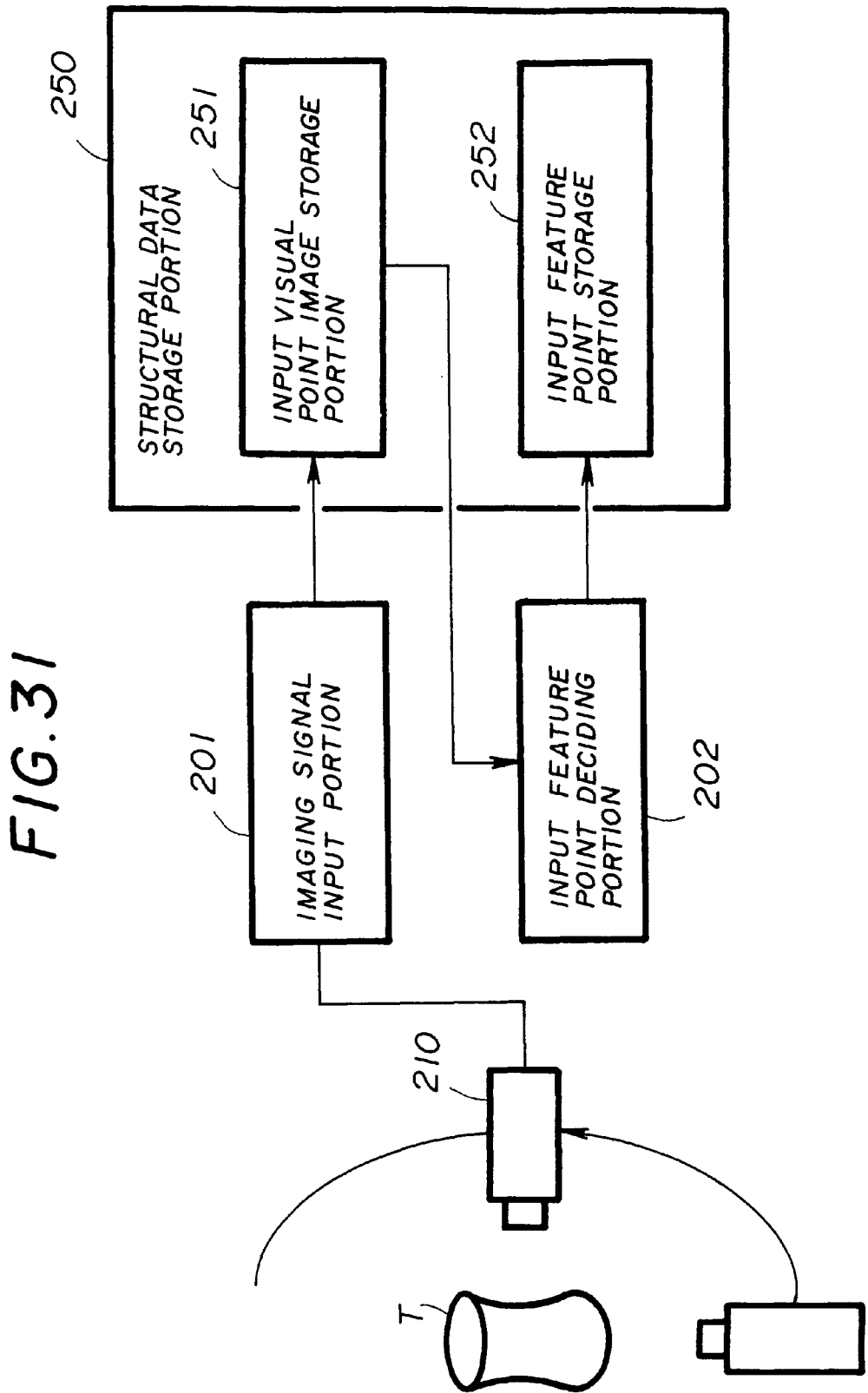
FIG. 31 is a block diagram illustrating a first example of a functional constitution of the structural data generating apparatus.

A functional structure of the structural data generating apparatus 200 formed using the computer system is shown in FIG. 31.

Referring to FIG. 31, the structural data generating apparatus 200 has an imaging signal input portion 201, an input feature point deciding portion 202 and a structural data storage portion 250. The imaging signal input portion 201 is embodied by the imaging signal input circuitry 22 and processing steps executed by the CPU 20 in accordance with the programs. The input feature point deciding portion 202 is embodied by processing steps executed by the CPU 20 in accordance with the programs. The structural data storage portion 250 is formed in the external storage unit 24.

The structural data storage portion 250 has an input visual point image storage portion 251 and an input feature point storage portion 252. Pictures of the body T are taken by the camera from a plurality (N) of visual points, and obtained image data (input image data) from the respective visual points is stored in the input visual point image storage portion 251. The input feature point storage portion 252 stores positions of feature points in a format as shown in FIG. 9. The positions of the feature points are decided on the body image from each of N visual points by the input feature point deciding portion 202.

The input feature point deciding portion 202 decides the position of the feature points on the N body images (the input image data) stored in the input visual point image storage portion 251 in accordance with the following procedure.

N body images stored in the input visual point image storage portion 251 are successively displayed on a screen of the display unit 23 one by one. Looking at a body image displayed on the screen of the display unit 23, the user specifies feature points on the displayed body image using the input unit 220 (the mouse). The specified feature points may correspond to distinctive points on the body T (e.g, points on boundary between different colors, points at which the shape is varied, and the like). A reference number identifying each of the specified feature points is input using the input unit 220 (the keyboard). Feature points, on the body images from the respective visual points, corresponding to the same distinctive point on the body T may be represented by different coordinates. However, the feature points on the respective body images corresponding to the same distinctive point on the body are provided with the same reference number.

The input feature point deciding portion 202 detects a position specified by the input unit 220 (the mouse) and supplies coordinates corresponding to the detected position and the reference number input by the input unit 220 (the keyboard) to the input feature point storage portion 252. As a result, the coordinates of the specified feature point (the detected position) are stored in the input feature point storage portion 252 (see FIG. 9).

The coordinates of the feature portions may be automatically decided by processing the body images from the respective visual points stored in the input visual point image storage portion 151. In this case, the input feature point deciding portion 202 is formed as shown in FIG. 32.

Figure 32:
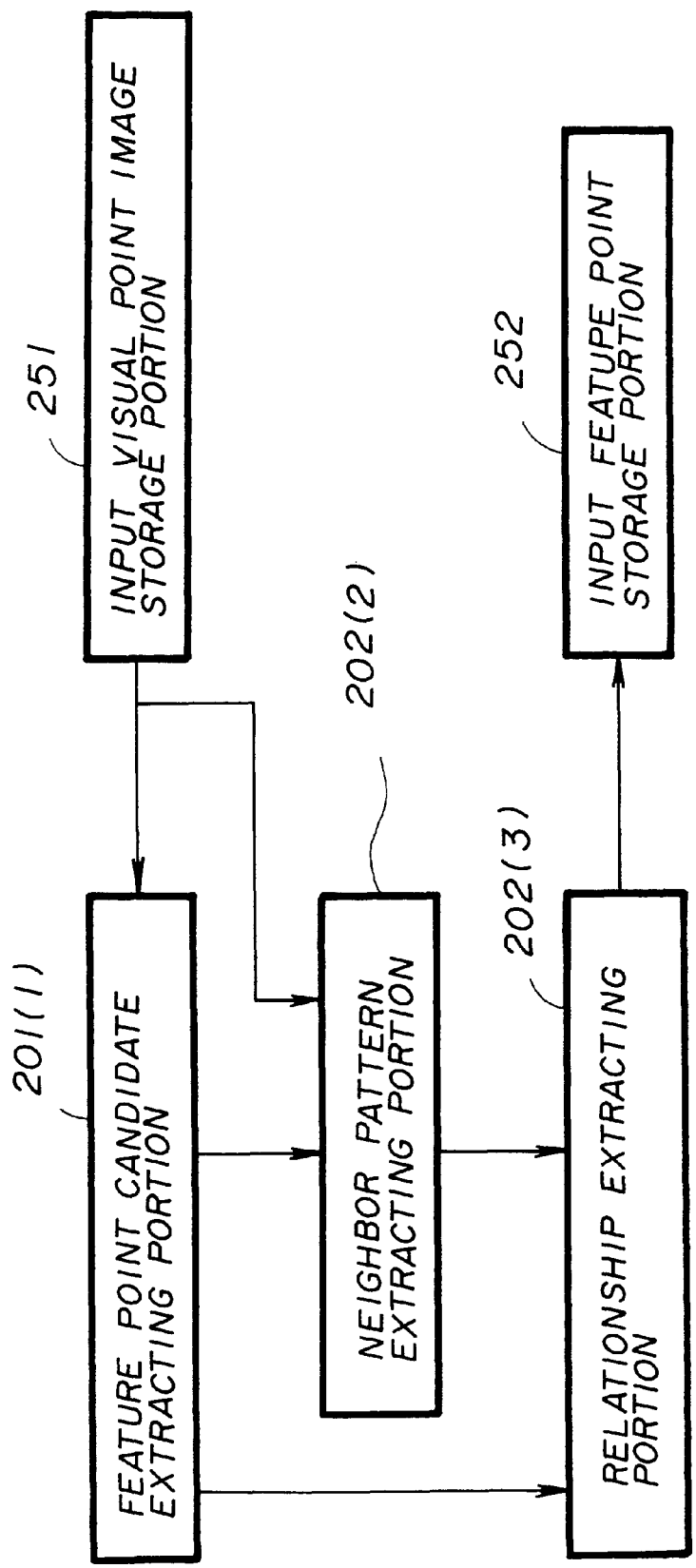
FIG. 32 is a block diagram illustrating a detailed functional constitution of an input feature point determination unit of the structural data generating apparatus shown in FIG. 31.

Referring to FIG. 32, the input feature point deciding portion 202 has a candidate extracting portion 202(1), a neighbor pattern extracting portion 202(2) and a relationship extracting portion 202(3). In the candidate extracting portion 202(1), a spatial filter (e.g., Gaussian-Laplacian spatial filter) is applied to each of the body images stored in the input visual point image storage portion 251 so that variation of density at each pixel of each of the body images is output. A pixel at which the variation of the density is greater than a predetermined value and the variation of the density at any neighboring pixel is extracted as a candidate of the feature point.

In the neighbor pattern extracting portion 202(2), an image pattern on an area in which an attentional pixel corresponding to each of candidates of the feature points included in a body image is located at the center (a neighbor pattern) is extracted from the body image stored in the input visual point image storage portion 251. For example, an image pattern on an area of n×n pixels in which the attentional pixel is located at the center is extracted as the neighbor pattern.

In the relationship extracting portion 202(3), feature points corresponding to each other between the body images are extracted based on the similarities between the neighbor patterns extracted by the neighbor pattern extracting portion 202(2) in accordance with the following procedure.

In step 1, candidates of the feature points extracted from a first body image are numbered from 1 to M.

In step 2, a neighbor pattern for a candidate of the feature point numbered m (m=1, 2, ..., M) is defined as an m-th representative pattern.

In step 3, "n" is set at one (n=1).

In step 4, the difference between the m-th preventative pattern and each of neighbor patterns of candidates of feature points extracted from the n-th body image is calculated. If the difference is less than a predetermined threshold, a feature point corresponding to the neighbor pattern is numbered m. The m-th representative pattern is then updated as follows.

That is, in a case where the m-th representative pattern has been updated k times at this time, the m-th representative pattern which has not yet been updated is multiplied by a weight "k+1". The neighbor pattern of the body image (the I-th body image) to which attention is paid when the above difference is less than the predetermined threshold is then multiplied by "1". The above products (the results of the multiplying operations) are averaged so that a new m-th representative pattern is obtained.

In step 5, one is added to "n" (n=n+1).

In step 6, if n<N, the process returns to step 4. On the other hand, if n=N, the process proceeds to the next step.

In step 7, a number of candidates of feature points numbered m (m=1, 2, ..., M) is calculated. If the number of the candidates of feature points is equal to or greater than a predetermined threshold, the candidates of the feature points numbered m are decided as feature points numbered m.

After steps 1 through 7 are executed with respect to the first body image, excepting the feature points extracted from the candidates of the feature points, steps 1 through 7 are repeatedly executed with respect to the remaining body images (from the 2nd body image to the N-th body images). Candidates of the feature points extracted from the second body image are numbered from 1 to M in step 1. After this, the same process described above is applied to the remaining body images (the third body image to the Nth body image). When the same process applied to the (N−1)-th body image and N-th body image is completed, the relationship extracting portion 202(3) is terminated.

Data of the body images from the respective visual points stored in the input visual point image storage portion 251 (the input visual point images) and data of the feature points set on the respective body images stored in the input feature point storage portion 252 are transferred to a recording medium (e.g., a CD-ROM) and stored therein. The body images from the respective visual points and the feature points set on the body images are supplied to the image production processing apparatus 100 as described above using the recording medium. In addition, the body images from the respective visual points and the feature points both of which are stored in the structural data may be supplied to the image production processing apparatus 100 via a communication line.

Figure 33:
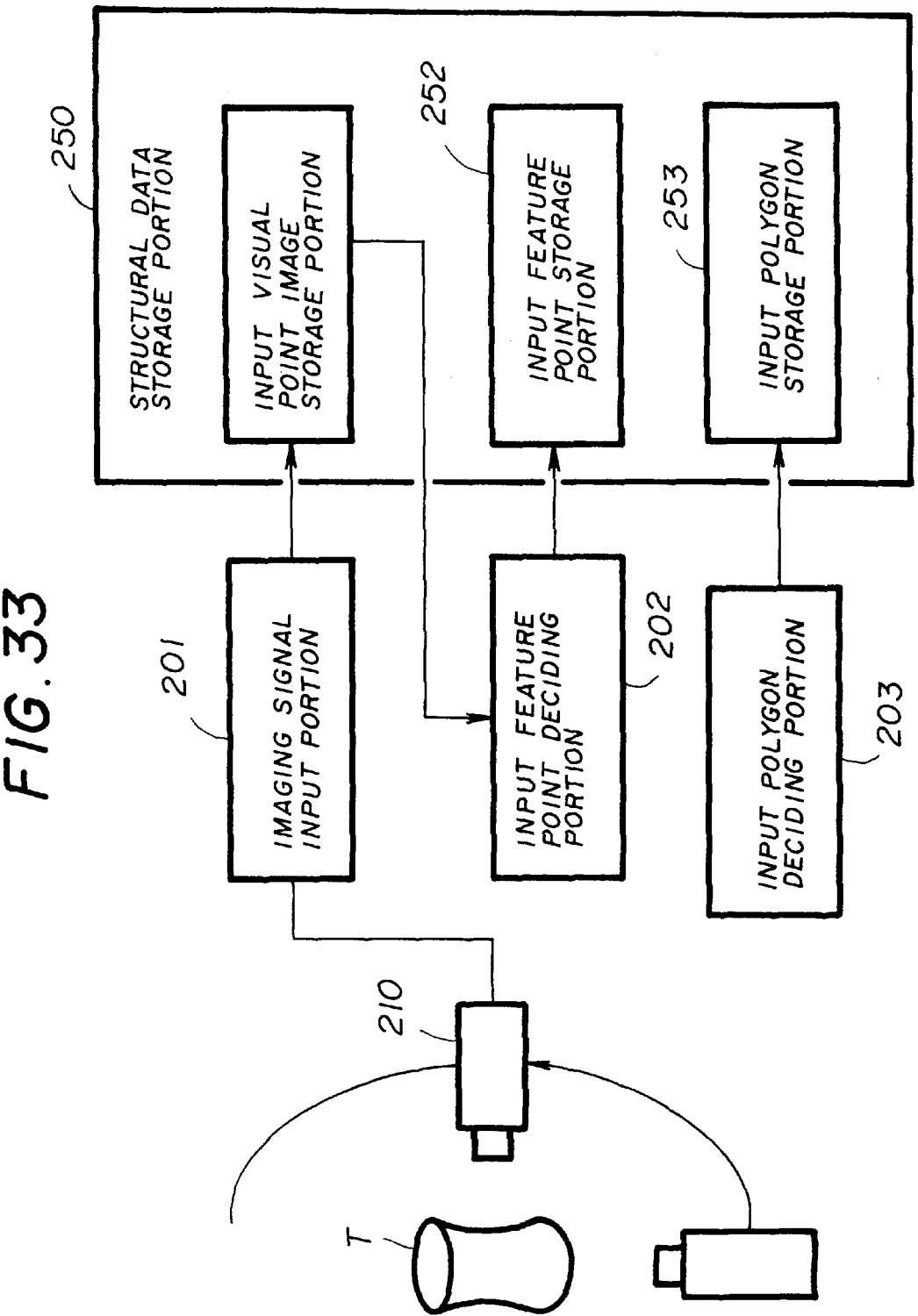
FIG. 33 is a block diagram illustrating a second example of the functional constitution of the structural data generating apparatus.

The structural data generating apparatus 200 may be functionally formed as shown in FIG. 33. In FIG. 33, those parts which are the same as those shown in FIG. 31 are given the same reference numbers.

In this example, the structural data generating apparatus 200 is provided with an input polygon deciding portion 203 and an input polygon storage portion 253.

The input polygon deciding portion 203 is embodied by a process executed by the CPU 20 in accordance with the programs. The input polygon deciding portion 203 decides a group of polygons in each of which the feature points decided on the body images by the input feature point deciding portion 202 are vertexes. The body images are stored in the input visual point image stored portion 251. Each of the polygons is represented by a set of feature points which are vertexes. The set of the polygons are decided so as to cover each of the body images. Sets of the feature points, on body images from different visual points, corresponding to each other identifies polygons, covering the body images from the different visual points, corresponding to each other.

A polygon in which feature points are vertexes is decided as follows.

A body image from a visual point stored in the input visual point storage portion 251 is displayed on the screen of the display unit 23. Positions of the feature points stored in the input feature point storage unit 252 are displayed on the screen of the display unit 23 so as to be superposed on the body image. Looking at the screen of the display unit 23, the user specifies two feature points using the mouse (the input unit 220). The system (the input polygon deciding portion 203) detects movement of the mouse, connects the specified feature points by a line and causes the display unit 23 to display the line between the specified feature points.

Thus, each of the lines connects feature points specified by the user using the mouse, so that the body image displayed on the screen of the display unit 23 is covered with polygons, such as triangles or quadrangles. The input polygon deciding portion 103 extracts a set of triangles or quadrangles based on results on the screen, and causes the input polygon storage portion 253 to store the set of the triangles or quadrangles as shown in FIG. 23 or 24.

Next, the system reads a body image from the next visual point out of the input visual point image storage portion 251. The body image, feature points set on the body image and polygons decided for the previous body image are displayed on the screen of the display unit 23. Looking at the screen of the display unit 23, the user specifies, using the mouse, polygons so that the polygons cover an area of the body image which area has not yet covered with polygons. The above processes are repeatedly performed, so that polygons in which the feature points set on the body images from all the visual points are vertexes are decided. The data regarding the decided polygons are input polygon storage portion 253 (see FIGS. 23 and 24).

The body images from the visual points stored in the input visual point image storage portion 251, the feature points set on the respective body images stored in the input feature point storage portion 252 and the groups of the polygons decided on the respective body images stored in the input polygon storage portion 253 are supplied to and stored in a recording medium, such as a CD-ROM. Using the recording medium, the body image from the respective visual points, the feature points and the polygons are supplied to the image production processing apparatus 100 which is, for example, functionally formed as shown in FIG. 22.

Figure 34:
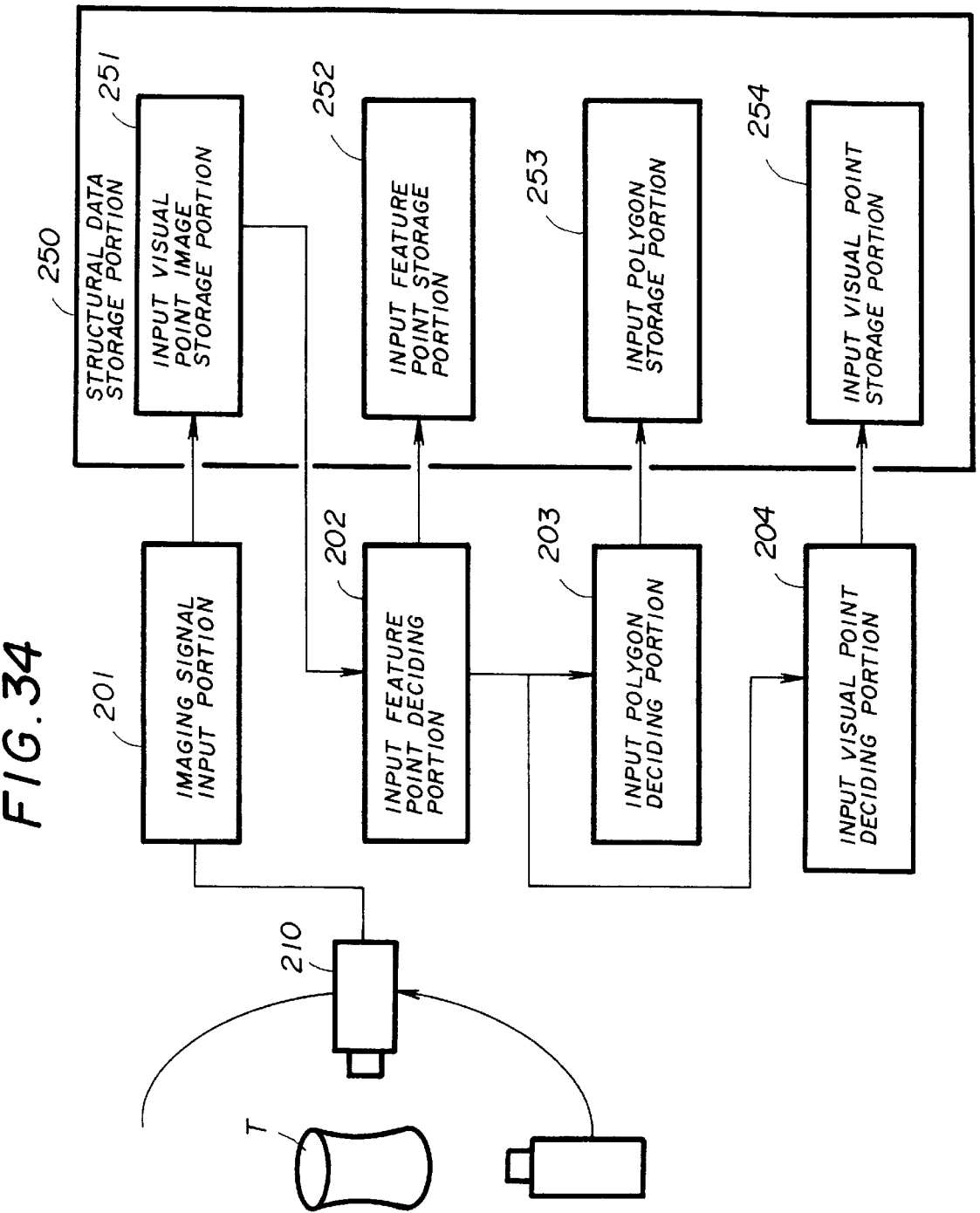
FIG. 34 is a block diagram illustrating a third example of the functional constitution of the structural data generating apparatus.

The structural data generating apparatus 200 may be functionally formed as shown in FIG. 34. In FIG. 34, those parts which are the same as those shown in FIG. 33 are given the same reference numbers.

In this example, the structural data generating apparatus is provided with an input visual point deciding portion 204 and an input visual point storage portion 254.

The input visual point deciding portion 204 is embodied by a process executed by the CPU 20 in accordance with the programs. The input visual point deciding portion 204 decides visual points of the body images stored in the input visual point image storage portion 251.

For example, every time the camera 210 takes a picture of the body T, the user measures a position (the longitude $\theta$ and the latitude $\phi$) of the camera 210 with respect to the body T. The measured position is input to the apparatus as a visual position using the input unit 220 (the keyboard). The system (the input visual position deciding portion 204) recognizes the visual position based on the input information (the longitude $\theta$ and the latitude $\phi$) and stores the data of the visual point in the input visual point storage portion 254. The data of the visual point stored in the input visual point storage portion 254 has a format as shown in FIG. 8.

Further, the input visual point decided portion 204 may obtain information of the visual point as follows.

That is, a visual point from which a body image is obtained is estimated based on positions of the feature points decided by the input feature point deciding portion 202. For example, a vector Qn representing a visual point is calculated in accordance with the above equations (12) and (13) in the same manner as that calculated in the input image estimating portion 122 of the image production processing apparatus 100 shown in FIG. 29.

The body images from the respective visual points, the feature points set on the body images, the sets of polygons covering the respective body images and the visual points all of which are stored in the structural data storage portion 250 are supplied to the image production processing apparatus 100 using a recording medium, such as a CD-ROM or via a communication line.

Figure 35:
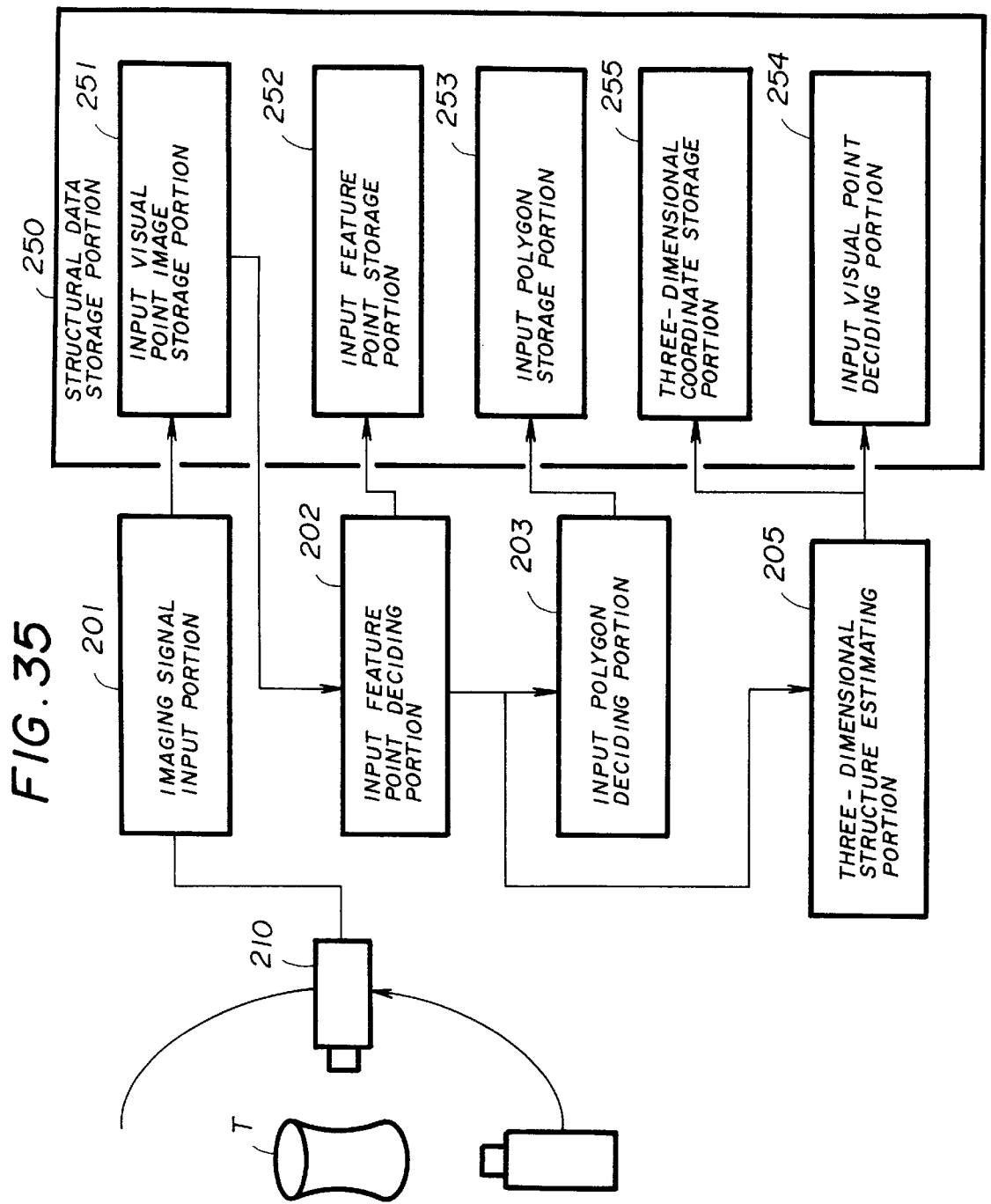
FIG. 35 is a block diagram illustrating a fourth example of the functional constitution of the structural data generating apparatus.

Further, the structural data generating apparatus 200 may be functionally formed as shown in FIG. 35. In FIG. 35, those parts which are the same as those shown in FIG. 34 are the same reference numbers.

In this example, a three-dimensional coordinate storage portion 255 and a three-dimenstional structure estimating portion 205 are provided in the structural data generating apparatus 200.

The three-dimensional structure estimating portion 205 is embodied by a process executed by the CPU 20 in accordance with the programs. The three-dimensional structure estimating portion 205 calculates a vector Qn representing a visual point and a three-dimensional coordinate Rm of a feature point in accordance with the above equations (12) and (13) in the same manner as the three-dimensional coordinate estimating portion 121 of the image production processing apparatus 100. The vector Qn representing the visual point is stored in the input visual point storage portion 254 of the structural data storage portion 250. In addition, the three-dimensional coordinate Rm of the feature point is stored in the three-dimentional coordinate storage portion 255.

The body images from the respective visual points, the feature points set on the respective body images, the polygons covering the respective body images, the three-dimensional coordinates of the feature points and the visual points all of which are stored in the structural data storage portion 250 are supplied, as the structural data, to the image production processing apparatus 100.

Figure 36:
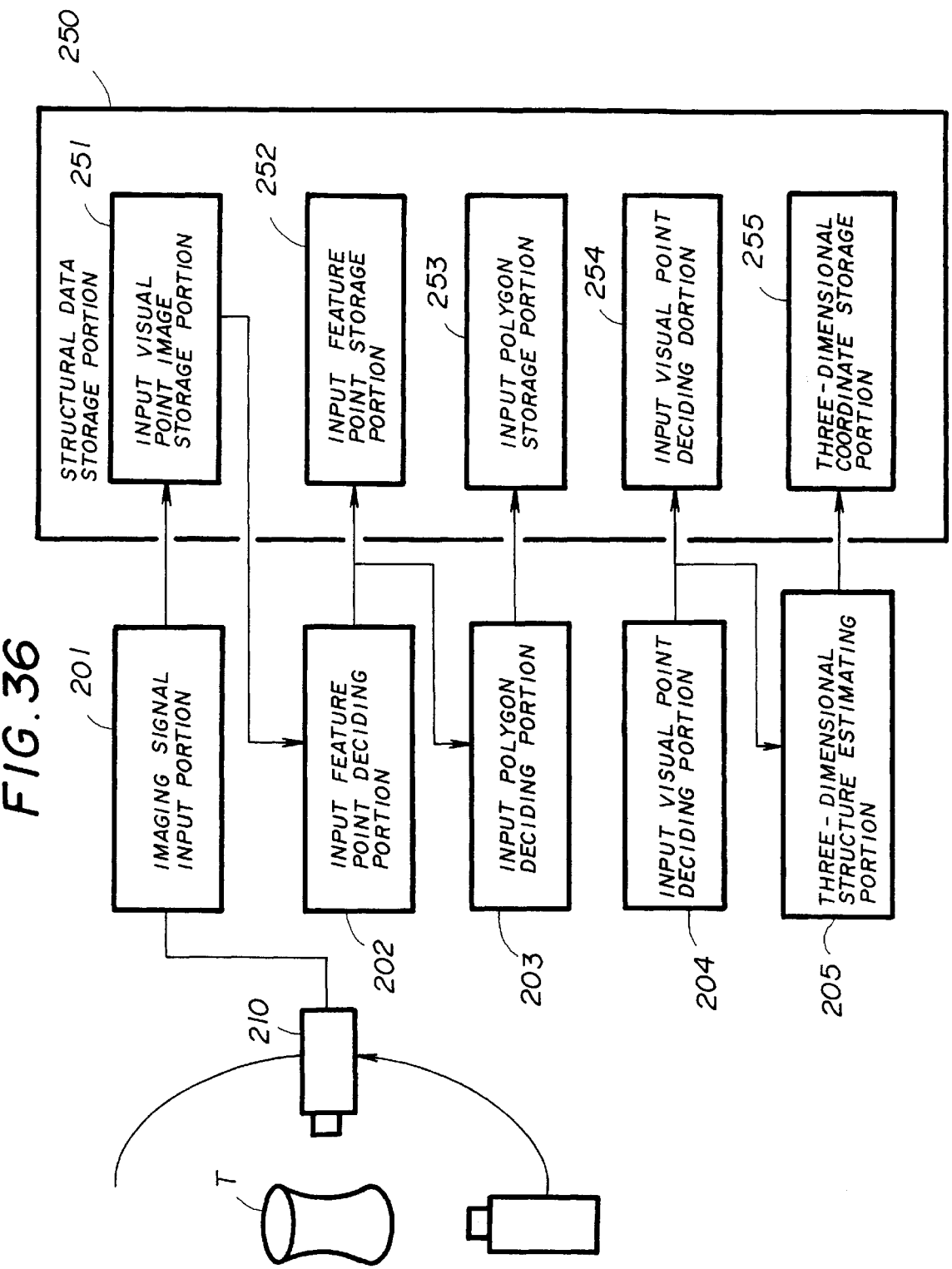
FIG. 36 is a block diagram illustrating a fifth example of the functional constitution of the structural data generating apparatus.

The structural data generating apparatus 200 may be functionally formed as shown in FIG. 36.

In this example, points on the body T corresponding to the respective feature points are estimated in the same manner as in the previous example (see FIG. 35), and data of the respective visual points are estimated.

The input visual point deciding portion 204 obtains information (the longitude θ and the latitude φ) representing a visual point input from the input unit 220. The information is stored in the input visual point storage portion 254 in a format as shown in FIG. 8.

In this state, the three-dimensional coordinate estimating portion 205 estimates three-dimentional coordinates of a point on the body T corresponding to a feature point, based on information of the visual points input as described above and information of positions of the feature points stored in the input feature point storage portion 252. That is, a vector Rm representing three-dimensional coordinates of the point is calculated in accordance with the above equations (12) and (13) in the same manner as in the previous case (see FIG. 36). In this case, since the information of the input visual point is known, the vectors Qn, in and jn in the equations (12) and (13) are known, so that the calculating operation is easy. Thus, the estimating accuracy is improved.

Figure 37:
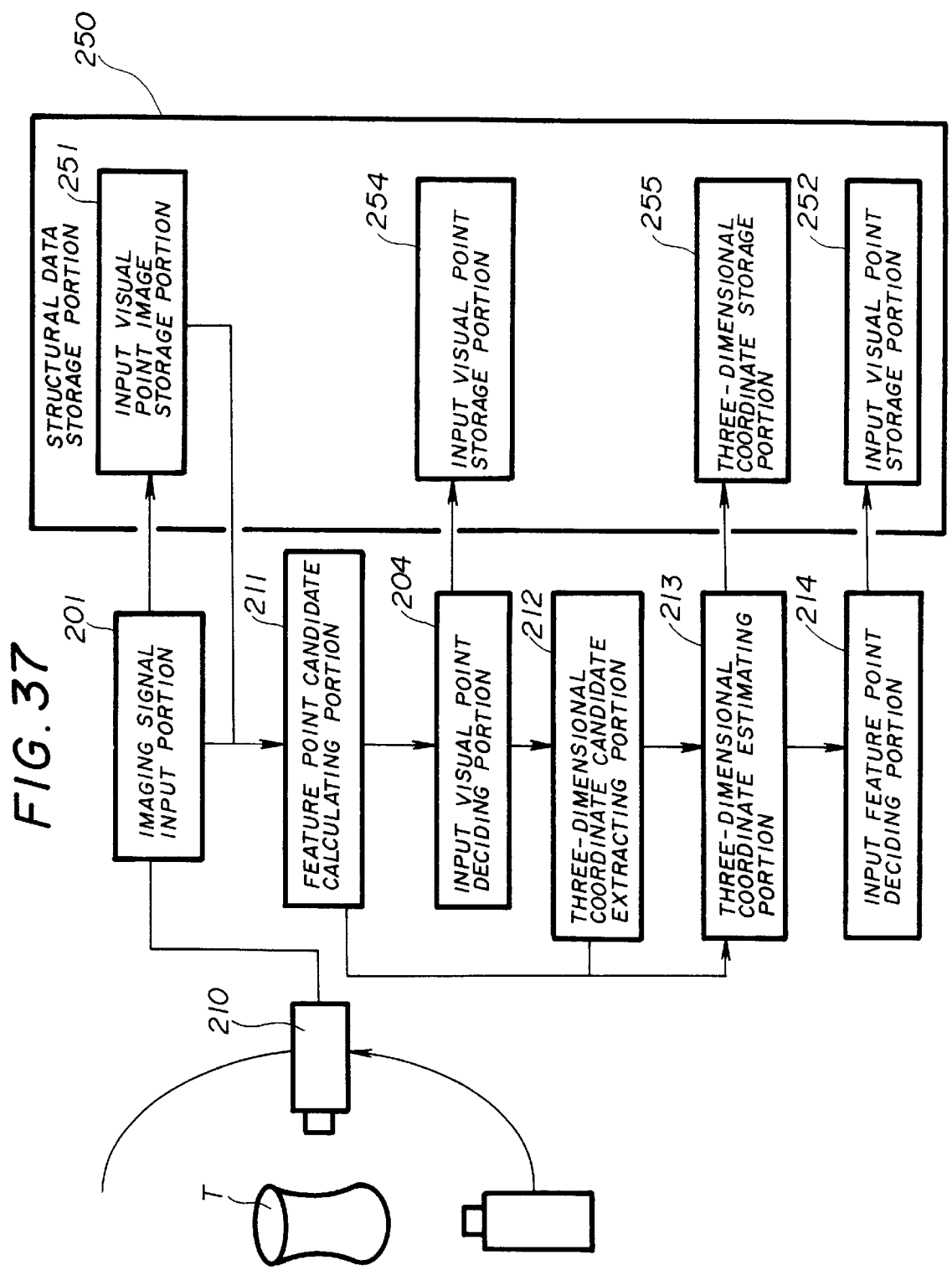
FIG. 37 is a block diagram illustrating a sixth example of the functional constitution of the structural data generating apparatus.

The structural data generating apparatus 200 may be functionally formed as shown in FIG. 37.

In this example, candidates of feature points are decided on images of the body T from respective visual points, and three-dimensional coordinates of points on the body T corresponding to points which should be feature points among the candidates of the feature points are calculated. Feature points are decided based on the three-dimentional coordinates.

Referring to FIG. 37, the structural data storage portion 250 formed in the external storage unit 24 has the input visual point image storage portion 251, the input feature point storage portion 252, the input visual point storage portion 254 and the three-dimensional coordinate storage portion 255. These portions 251, 252, 254 and 255 are the same as those described in the above examples.

In addition, the structural data generating apparatus 200 has the imaging signal input portion 201, a feature point candidate calculating portion 211, the input visual point deciding portion 204, a three-dimensional coordinate candidate extracting portion 212, a three-dimensional coordinate estimating portion 213 and an input feature point deciding portion 214.

Body images from respective visual points which are based on pictures of the body T taken by the camera 210 are supplied to the input visual point image storage portion 251 via the imaging signal input portion 201. The body images are then stored in the input visual point image storage portion 251. The input visual point deciding portion 204 decides positions of visual points from which the images of the body T, stored in the input visual point image storage portion 251, are obtained in the same manner as in the above example (see FIG. 34).

The feature point candidate calculating portion 211 extracts candidates of feature points (feature point candidates) from body images from the respective visual points stored in the input visual point image storage portion. The feature point candidate calculating portion 211 processes the respective body images in the same manner as the candidate extracting portion 202(1) shown in FIG. 32 so that distinctive points (the feature point candidates) at which the density is abruptly varied are extracted from the body images.

The three-dimensional coordinate candidate extracting portion 212 calculates candidates of three-dimensional coordinates (three-dimensional coordinate candidates) of points on the body T corresponding to the feature point candidates, based on the positions of the feature point candidates calculated by the feature point candidate calculating portion 211 and the information of the respective visual points stored in the input visual point storage portion 251. For example, in accordance with the orthogonal projection method, the three-dimensional coordinate candidates are extracted as follows. In a case where the perspective projection method is used, the three-dimenstional coordinate candidates are extracted in the same manner as in the case of the orthogonal projection method.

Supposing that there are N visual points from a visual point 1 to a visual point N, two visual points are selected from among the N visual points at random. For example, three visual points: visual points A, B and C are selected. A feature point candidate is selected, at random, from among the feature point candidates extracted from the body image from the visual point A. Coordinates of the extracted feature point candidate is represented by (xa, ya). A feature point candidate is selected, at random, from among the feature point candidates extracted from the body image from the visual point B in the same manner as in the case of the visual pint A. Coordinates of the extracted feature point candidate is represented by (xb, yb). A unit vector in the x-axis direction on an image plane defined when a picture of the body is taken from the visual point A is represented by ia, and a unit vector in the y-axis direction on the image plane is represented by ja. In the case of the visual point B, unit vectors ib and jb are defined in the same manner as in the case of the visual point A.

If the feature point candidate (xa, ya) on the body image from the visual point A and the feature point candidate (xb, yb) on the body image from the visual point B correspond to the same point $R=(X, Y, Z)^T$ in a three-dimensional space, the following equations obtained, in the same manner as in the case of the orthogonal projection method described above.

$$xa=(ia, R), ya=(ja, R)$$

$$xb=(ib, R), yb=(jb, R) \qquad (14)$$

J is defined as $$J=(xa-(ia, R))^2+(ya-(ja, R))^2+(xb-(ib, R))^2+(yb-(jb, R))^2. \qquad (15)$$

In this case, if the feature points (xa, ya) and (xb, yb) are obtained by projecting the same point in the three-dimensional space, the value of J is equal to zero (J=0).

R is then calculated under a condition in which the value of J is minimum, and the minimum value $J_{min}$ of J is calculated. If the minimum value $J_{min}$ is less than a predetermined threshold, R is obtained as a candidate of the three-dimensional coordinates.

The above process is repeated selecting a set of visual points and feature points with respect to the selected visual points so that sets of three-dimentional coordinate candidates are output. Every time candidates of the three-dimensional coordinates are extracted, the following processes in the three-dimensional coordinate estimating portion 213 and input feature point deciding portion 214 may be performed.

The candidates of the three-dimensional coordinates extracted by the three-dimensional coordinate candidate extracting portion 212 are projected on the body images from the respective visual points. Based on projected points on the body images from the respective visual points and relationships between feature point candidates neighboring the projected points, the three-dimensional coordinate estimating portion 213 calculates three-dimensional coordinates of points on the body T corresponding to the feature points.

A point R in the three-dimensional space may be extracted as a three-dimensional coordinate candidate by the three-dimensional coordinate candidate extraction portion 212. In case, this points are projected on image planes from each of the visual points 1 to N. The unit vector in the x-axis direction on an image plane on which the point is projected from the visual point N is represented by in. The unit vector in the y-axis direction on the image plane is represented by jn. Coordinates of the projected point are calculated as follows.

$$xn=(in, R) \text{ and } yn=(jn, R) \qquad (16)$$

In each of the visual points, the difference between the projected point (xn, yn) and a feature point candidate closest to the projected point is calculated. In a case where the calculated difference is less than a predetermined threshold, a score is incremented by one. After the same process for the visual point N is completed, if the score is greater than a predetermined threshold, the three-dimensional coordinates are output.

The above process is performed with respect to all the candidates of the three-dimensional coordinates extracted by the three-dimensional coordinate candidate extracting portion 212. As a result, from the candidates extracted by the three-dimensional coordinate candidate extracting portion 212, one having a high reliability is selected as the three-dimensional coordinate.

The coordinates of each of the points on the body T corresponding to one of the feature points output from the three-dimensional coordinate estimating portion 213 are stored in the three-dimensional coordinate storage portion 255.

The input feature point deciding portion 214 stores, in the input feature point storage portion 252, coordinates of points obtained by projecting points represented by three-dimensional coordinates output from the three-dimensional coordinate estimating portion 213 are stored, as coordinates of input feature points, in the input feature point storage portion 252.

In a case where a vector R represented by three-dimensional coordinates is output from the three-dimensional coordinate estimating portion 213, the point corresponding to the vector R is projected on images planes with respect to the respective visual points 1 to N. The unit vector in the x-axis direction on an image plane on which the point is projected from the visual point N is represented by in, and the unit vector in the y-axis direction on the image plane is represented by jn. Coordinates (xn, yn) of the projected point are calculated as follows.

$$xn=(in, R), \text{ and } yn=(jn, R) \qquad (17)$$

This process is performed for all the three-dimensional coordinates output from the three-dimensional coordinate estimating portion 213. The coordinates obtained in accordance with the equations (17) are stored in the input feature point storage portion 252.

The above process is in accordance with the orthogonal projection method. In a case where the process is in accordance with the perspective projection method, the respective equations (14), (15), (16) and (17) are changed as follows.

The equations (14) is changed to the following equations (18).

$$xn=f(in, R-Qn)/(in \times jn, R-Qn)$$

$$yn=f(jn, R-Qn)/(in \times jn, R-Qn) \qquad (18)$$

The equation (15) is changed to the following equation (19)

$$J=(xa-f(ia, R-Qa)/(ia \times Ja, R-Qa))^2+(ya-f(ja, R-Qa)/(ia \times ja, R-Qa))^2+(xb-f(ib, R-Qb)/(ib \times jb, R-Qb))^2+(yb-f(jb, R-Qb)/(ib \times jb, R-Qb))^2 \qquad (19)$$

The equations (16) is changed to the following equations (20).

$$xn=f(in, R-Qn)/(in \times jn, R-Qn)$$

$$yn=f(jn, R-Qn)/(in \times jn, R-Qn) \qquad (20)$$

The equations (17) is changed to the following equations (21).

$$xn=f(in, R-Qn)/(in \times jn, R-Qn)$$

$$yn=f(jn, R-Qn)/(in \times jn, R-Qn)$$

The present invention is not limited to the aforementioned embodiments, and other variations and modifications may be made without departing from the scope of the claimed invention.

What is claimed is:

1. An image production processing apparatus comprising:

input visual point image storage means for storing body images obtained by taking pictures of a body from a plurality of visual points so that each of the body images corresponds to one of the plurality of visual points;

input feature point storage means for storing positions of feature points, corresponding to each other, on the body images stored in said input visual point image storage means, the feature points determined by calculating a difference, for each visual point, between a projected three-dimensional feature point candidate and a closest feature point candidate, and incrementing a score when the difference is less than a predetermined threshold, and selecting the feature point when the total score is greater than another predetermined threshold;

input visual point storage means for storing positions of the visual points from which the pictures of the body are taken to obtain the body images stored in said input visual point image storage means;

visual point selecting means for selecting a predetermined number of visual points from among the visual points stored in said input visual point storage means when a visual point is specified, the selected visual points being closest to the specified visual point; and image producing means for producing a body image from the specified visual point from the body images from the selected visual points, based on relationships between feature points on the body images from the selected visual points which feature points are obtained from said input feature point storage means, and based on positional relationships between the selected visual points and the specified visual point, said image producing means comprising:

coordinate transformation deciding means for deciding coordinate transformation equations based on the relationships between the feature points on the body images from the selected visual points, the coordinate transformation equations transforming positions on the body images from the selected visual points into positions on the body image from the specified visual point;

image conversion executing means for converting the body images from the selected visual points into body images from the specified visual point using the coordinate transformation equations decided by said coordinate transformation deciding means; and image synthesizing means for synthesizing, based on the positional relationships between the selected visual points and the specified visual point, the body images into which the body images from the selected visual points are converted by said image conversion executing means, a synthesized body image being output as the body image from the specified visual points, wherein said image synthesizing means averages data of pixels, corresponding to each other, of the body images from the selected visual points by using weights, so that data of a corresponding pixel of the body image from the specified visual point are calculated, the weights being determined based on the positional relationships between the selected visual points and the specified visual point.

2. The image production processing apparatus as claimed in claim 1, wherein said coordinate transformation deciding means comprises:

first means for deciding coordinate transformation equations based on a relationship between a feature point on a body image from a first visual point out of the selected visual points and a corresponding feature point on a body image from each of other visual points out of the selected visual points, the coordinate transformation equations transforming positions on the body image from the first visual point into positions on the body images from the other visual points; and second means for applying weights, based on the relationships between the selected visual points and the specified visual point, to the respective coordinate transformation equations decided by said first means and for synthesizing the respective coordinate transformation equations to which the weights are applied, so that, in a case of setting each of the selected visual points as the first visual point, said second means calculates the coordinate transformation equations to transform the positions on the respective body images from all the selected visual points into the positions on the body image from the specified visual point.

3. The image production processing apparatus as claimed in claim 1, wherein said coordinate transformation deciding means comprises:

output feature point calculating means for calculating, based on the relationships between the selected visual points and the specified visual point, calculating positions of the feature points on the body image from the specified visual point from corresponding feature points on the body images from the selected visual points; and calculating means for calculating, based on the relationships between the positions of the feature points on the body images from the selected visual points and the positions of the feature points calculated by said output feature point calculating means, the coordinate transformation equations to transfer the positions on the body images from the selected visual point to the positions on the body image from the specified visual point, wherein said output feature point calculating means has means for averaging the positions of the feature points from the selected visual points with weights based on the relationships between the selected visual points and the specified visual point so that the positions of the corresponding feature points on the body image from the specified visual point are calculated.

4. The image production processing apparatus as claimed in claim 3, wherein said output feature point calculating means comprises:

first means for calculating coefficients of affine transformations corresponding to the selected visual points, based on the relationships between the selected visual points and the specified visual point; and means for calculating, based on the positions of the feature points on the body image from each of the selected visual points and the coefficients a corresponding one of the affine transformations, the positions of the corresponding feature points on the body image from the specified visual point.

5. The image production processing apparatus as claimed in claim 3 further comprising:

input polygon storage means for storing information representing polygons covering each of the body images from the respective visual points, vertexes of each of the polygons being the feature points on a corresponding one of the body images stored in said input feature point storage means, each of the polygons of one of the body images corresponding to one of the polygons of each of other body images, wherein said means for calculating the coordinate transformation equations comprises:

output polygon extracting means for extracting polygons in which the feature points calculated by said output feature point calculating means as the feature point on the body image from the specified visual point are vertexes, the polygons corresponding to the polygons covering on each of the body images from the respective visual points stored in said input polygon storage means; and means for calculating coordinate transformation equations to transform the polygons of the body image from each of the respective visual points stored said input polygon storage means into the polygons extracted by said output polygon extracting means, the coordinate transformation equations being used as the coordinate transformation equations to transform the points on the body image from each of the visual points into the points on the body image from the specified body image.

6. The image production processing apparatus as claimed in claim 5, wherein each of the polygons is a triangle, and wherein said calculating means calculates the coordinate transformation equations based on affine transformation to decide coefficients for each of triangles.

7. The image production processing apparatus as claimed in claim 5, wherein each of the polygons is a quadrangle, and wherein said calculating means calculates the coordinate transformation equations based on projection transformation to decide coefficients for each of quadrangles.

8. The image production processing apparatus as claimed in claim 3, wherein said calculating means for calculating the coordinate transformation equations comprises:

polygon extracting means for extracting polygons covering each of the body images from the respective visual points, vertexes of each of the polygons being the feature points on a corresponding one of the body images stored in said input feature point storage means, each of the polygons of one of the body images corresponding to one of the polygons of each of other body images, and for extracting polygons corresponding to the above extracted polygons, in each of which polygons the feature points on the body image from the specified visual point calculated by said output feature point calculating means are vertexes; and means for calculating coordinate transformation equations to transform the polygons of the body image from each of the visual points extracted by said polygon extracting means into the polygons of the body image from the specified visual point extracted by said polygon extracting means, the coordinate transformation equations being used as the coordinate transformation equations to transform the points on the body image from each of the visual points into the points on the body image from the specified body image.

9. The image production processing apparatus as claimed in claim 1 further comprising:

three-dimensional coordinate storage means for storing three-dimensional coordinates of points on the body corresponding to the feature points on the body images from the respective visual points stored in said input feature point storage means, wherein said coordinate transformation deciding means comprises:

output feature point calculating means for calculating, based on the three-dimensional coordinates of the points on said body corresponding to the feature points which three-dimensional coordinates are stored in said three-dimensional coordinate storage means, positions of corresponding feature points on the body image from the specified visual point; and calculating means for calculating, based on relationships between the positions of the feature points on the body images from the selected visual points and the positions of the feature points calculated by said output feature point calculating means, the coordinate transformation equations to transform the positions on the body images from the selected visual points into the positions on the body images from the specified visual point.

10. The image production processing apparatus as claimed in claim 9 further comprising:

surface polygon storage means for storing information representing polygons covering the body, the points on the body each of which is represented by the three-dimensional coordinates stored in said three-dimensional coordinate storage means being vertexes of each of the polygons, wherein said calculating means comprises:

polygon extracting means for extracting polygons in each of which the feature points on the body image from each of the respective visual points stored in said input feature point storage means are vertexes, the polygon corresponding to the polygons represented by the information stored in said surface polygon storage means, and for extracting polygons in each of which feature points calculated by said output feature point calculating means as the feature points on the image body from the specified visual point are vertexes, the polygons corresponding to the polygons represented by the information stored in said surface polygon storage means; and means for calculating coordinate transformation equations to transform the polygons extracted by said polygon extracting means which polygons are set on the body image from each of the visual points into the polygons extracted by said polygon extracting means, the coordinate transformation equations being used as the coordinate transformation equations to transform the position on the body image from each of the visual points into the position on the body image from the specified visual point.

11. The image production processing apparatus as claimed in claim 9 further comprising:

three-dimensional coordinate estimating means for estimating three-dimensional coordinates of points on the body corresponding to the feature points on the body image from each of the visual points stored in said input feature point storage means, the estimated three-dimensional coordinates being stored in said three-dimensional coordinate storage means.

12. The image production processing apparatus as claimed in claim 1 further comprising:

input visual point estimating means for estimating positions of each of the visual points from which pictures of the body are taken, based on the position of the feature points on the body image from each of the visual points stored in said input feature point storage means.

13. The image production processing apparatus as claimed in claim 1, wherein said visual point selecting means selects a predetermined number of visual points closest to the specified visual point from among the visual points stored in said input visual point storage means.

14. The image production processing apparatus as claimed claim 1, wherein said visual point selecting means has a table indicating relationships between ranges in which the visual point should be specified and the visual points to be selected, wherein when a visual point is selected, the visual points within a range in which the selected visual point is located are selected.

15. A recording medium which stores a program instructing a computer system to execute a process in an image production processing apparatus for producing a body image from a visual point based on body images obtained by taking pictures of a body from a plurality of visual points and positions of feature points, corresponding to each other, set on the body images from the plurality of visual points, said program comprising:

feature point determining means for determining the feature points by calculating a difference, for each visual point, between a projected three-dimensional feature point candidate and a closest feature point candidate, and incrementing a score when the difference is less than a predetermined threshold, and selecting the feature point when the total score is greater than another predetermined threshold;

visual point selecting means for selecting a predetermined number of visual points from among the visual points stored in said input visual point storage means when a visual point is specified, the selected visual points being closest to the specified visual point;

image producing means for producing a body image from the specified visual point based on the body images from the selected visual points, based on relationships between the feature points on the body images from the visual points selected by said visual point selecting means and relationships between the selected visual points and the specified visual point;

coordinate transformation deciding means for deciding coordinate transformation equations based on the relationships between the feature points on the body images from the selected visual points, the coordinate transformation equations transforming positions on the body images from the selected visual points into positions on the body image from the specified visual point;

image conversion executing means for converting the body images from the selected visual points into body images from the specified visual point using the coordinate transformation equations decided by said coordinate transformation deciding means; and image synthesizing means for synthesizing, based on the relationships between the selected visual points and the specified visual point, the body images into which the body images from the selected visual points are converted by said image conversion executing means, a synthesized body image being output as the body image from the specified visual point, wherein said image synthesizing means has means for averaging data of pixels, corresponding to each other, of the body images from the selected visual points with weights based on the relationships between the selected visual points and the specified visual points so that data of a corresponding pixel of the body image from the specified visual point is calculated.

16. A structural data generating apparatus comprising:

input visual point image storage means for storing body images obtained by taking pictures of a body from a plurality of visual points so that each of the body images corresponds to one of said plurality of visual points;

feature point candidate calculating means for extracting candidates of feature points from the body images from the respective visual points stored in said input visual point image storage means;

input visual point setting means for setting positions of the visual points from which pictures of the body are taken to obtain the body images stored in said input visual point image storage means;

input visual point storage means for storing the position of the visual points set by said input visual point setting means;

three-dimensional coordinate candidate extracting means for extracting three-dimensional coordinates of points on the body corresponding to the candidates of the feature points, based on the positions of the candidates of the feature points on the body images from the respective visual points calculated by said feature point candidate calculating means and based on the positions of the visual points stored in said input visual point storage means;

three-dimensional coordinate calculating means for calculating three-dimensional coordinates of positions on the body which should be the feature points, said three-dimensional coordinate calculating means projecting the extracted candidates of the three-dimensional coordinates on the body images from the respective visual points so as to generate projection points on the body images from the respective visual points, and determining the extracted candidates as the true three-dimensional coordinates when a score is incremented each time it is detected for one of the visual points that a difference between each projection point and a feature point candidate closest to the projection point is less than a predetermined threshold, and the resulting score for all of the visual points is larger than a predetermined threshold, so that the three-dimensional coordinates are calculated;

three-dimensional coordinate storage means for storing the three-dimensional coordinates calculated by said three-dimensional coordinate calculating means; and input feature point deciding means for projecting the points represented by the calculated three-dimensional coordinates toward each of the visual points so that the feature points are calculated.

17. A recording medium which stores a program instructing a computer system to execute a process for generating structural data used in an image production processing apparatus for producing images of a body from a visual point, said program comprising:

feature point candidate calculating means for extracting candidates of feature points from body images obtained by taking pictures of a body from a plurality of visual points, the candidates of the feature points satisfying a predetermined condition;

input visual point setting means for setting positions of the visual points from which pictures of the body are taken to obtain the body images, the positions of the visual points being stored in an input visual point storage unit;

three-dimensional coordinate candidate extracting means for extracting three-dimensional coordinates of points on the body corresponding to the candidates of the feature points, based on the positions of the candidates of the feature points on the body images from the respective visual points calculated by said feature point candidate calculating means and based on the positions of the visual points stored in said input visual point storage unit;

three-dimensional coordinate calculating means for calculating three-dimensional coordinates of positions on the body which should be the feature points, said three-dimensional coordinate calculating means projecting the extracted candidates of the three-dimensional coordinates on the body images from the respective visual points so as to generate projection points on the body images from the respective visual points, and determining the extracted candidates as the true three-dimensional coordinates when a score is incremented each time it is detected for one of the visual points that a difference between each projection point and a feature point candidate closest to the projection point is less than a predetermined threshold, and the resulting score for all of the visual points is larger than a predetermined threshold, so that the three-dimensional coordinates are calculated; and input feature point deciding means for projecting the points represented by the calculated three-dimensional coordinates toward each of the visual points so that the feature points are calculated.

18. A method for image production processing comprising:

storing positions of feature points, corresponding to each other, on body images of a body obtained from a plurality of visual points so that each of the body images corresponds to one of the plurality of visual points, the feature points determined by calculating a difference, for each visual point, between a projected three-dimensional feature point candidate and a closest feature point candidate, and incrementing a score when the difference is less than a predetermined threshold, and selecting the feature point when the total score is greater than another predetermined threshold;

selecting a predetermined number of visual points from the plurality of visual points when a visual point is specified, the selected visual points being closest to the specified visual point; and synthesizing the body image for the specified visual point using the feature points for the selected visual points to determine coordinate transformation equations to transform positions on the body images for the selected visual points into positions on a body image of the specified visual point, and including averaging data of pixels, corresponding to each other, of the body images for the selected visual points with weights based on the relationships between the selected visual points and the specified visual point so that data of a corresponding pixel of the body image for the specified visual point are calculated.

* * * * *

UNITED STATES PATENT AND TRADEMARK OFFICE
CERTIFICATE OF CORRECTION

PATENT NO. : 6,184,892 B1  Page 1 of 1
DATED : February 6, 2001
INVENTOR(S) : Takashi Toriu et al.

It is certified that error appears in the above-identified patent and that said Letters Patent is hereby corrected as shown below:

Title page,
(56) References Cited, add the following Foreign References

| | | |
|---|---|---|
| 58-99087 | 06/1993 | Japan |
| 5-12413 | 01/1993 | Japan |
| 8-96165 | 04/1996 | Japan |

Signed and Sealed this

Seventh Day of August, 2001

*Attest:*

*Nicholas P. Godici*

*Attesting Officer*

NICHOLAS P. GODICI
*Acting Director of the United States Patent and Trademark Office*